United States Patent
Arbogast et al.

(10) Patent No.: US 8,613,278 B2
(45) Date of Patent: Dec. 24, 2013

(54) SOLAR THERMAL RECEIVER FOR MEDIUM- AND HIGH-TEMPERATURE APPLICATIONS

(75) Inventors: Porter Arbogast, Pasadena, CA (US); William Gross, Pasadena, CA (US); Steve Schell, Monrovia, CA (US)

(73) Assignee: Esolar, Inc., Pasadena, CA (US)

( * ) Notice: Subject to any disclaimer, the term of this patent is extended or adjusted under 35 U.S.C. 154(b) by 756 days.

(21) Appl. No.: 12/413,449

(22) Filed: Mar. 27, 2009

(65) Prior Publication Data

US 2009/0241938 A1 Oct. 1, 2009

Related U.S. Application Data

(60) Provisional application No. 61/072,297, filed on Mar. 28, 2008.

(51) Int. Cl.
*F03G 7/00* (2006.01)
(52) U.S. Cl.
USPC ........... 126/643; 126/607; 126/647; 126/651; 126/688; 60/641.15; 60/641
(58) Field of Classification Search
USPC .................. 126/643, 270; 60/641.12, 641.15; 136/89 PC
See application file for complete search history.

(56) References Cited

U.S. PATENT DOCUMENTS

| | | | |
|---|---|---|---|
| 980,505 A | 1/1911 | Emmet | |
| 1,989,999 A | 2/1935 | Niederle | |
| 3,227,153 A | 1/1966 | Godel et al. | |
| 3,952,724 A | 4/1976 | Pei | |
| 3,954,097 A | 5/1976 | Wilson, Jr. | |
| 4,015,584 A | 4/1977 | Haberman | |
| 4,016,860 A | 4/1977 | Moan | |
| 4,038,965 A | 8/1977 | Lyon | |
| 4,048,982 A | 9/1977 | Pei | |
| 4,069,810 A | 1/1978 | Tabor | |
| 4,080,831 A * | 3/1978 | Roberts et al. | 73/863.61 |
| 4,080,954 A | 3/1978 | de Wilde et al. | |
| 4,117,682 A * | 10/1978 | Smith | 60/641.8 |
| 4,119,083 A | 10/1978 | Heyen et al. | |
| 4,122,831 A * | 10/1978 | Mahdjuri | 126/657 |
| 4,126,121 A | 11/1978 | Fairbanks | |

(Continued)

OTHER PUBLICATIONS

International Search Report and Written Opinion dated May 27, 2009 for International Application No. PCT/US2009/038684, 8 sheets.

*Primary Examiner* — Kang Hu
*Assistant Examiner* — Nikhil Mashruwala
(74) *Attorney, Agent, or Firm* — Christie, Parker & Hale, LLP

(57) ABSTRACT

A receiver system for harnessing solar radiation. Embodiments of a receiver system include a receiver including one or more receiver elements, each receiver element including: a plurality of transparent tubes including a first tube and at least one second tube at least partially within the first tube; a first passage interposed between the first tube and the at least one second tube, the first passage having an inlet and an outlet; a second passage within the at least one second tube, the second passage having an inlet and an outlet; and an absorber in the at least one second tube, the absorber adapted to absorb the solar radiation. In some embodiments, a receiver further includes a housing having at least one transparent portion, the housing configured to enclose the plurality of receiver elements, whereby a third passage is formed between the first tube and the housing.

14 Claims, 33 Drawing Sheets

(56) References Cited

U.S. PATENT DOCUMENTS

| | | | |
|---|---|---|---|
| 4,151,828 A | 5/1979 | Mather et al. |
| 4,153,042 A | 5/1979 | Tragert |
| 4,158,354 A | 6/1979 | Carden |
| 4,179,830 A | 12/1979 | Lamb |
| 4,183,351 A | 1/1980 | Hinotani et al. |
| 4,184,478 A | 1/1980 | Fuller |
| 4,186,724 A | 2/1980 | Nelson |
| 4,197,830 A | 4/1980 | Wilson |
| 4,205,655 A | 6/1980 | Hunt |
| 4,227,515 A | 10/1980 | Jacob et al. |
| 4,245,618 A * | 1/1981 | Wiener | 126/643 |
| 4,257,396 A * | 3/1981 | Reinert | 126/625 |
| 4,278,829 A | 7/1981 | Powell |
| 4,296,738 A | 10/1981 | Kelton |
| 4,299,203 A | 11/1981 | Skopp |
| 4,307,712 A | 12/1981 | Tracy |
| 4,310,747 A * | 1/1982 | Rice et al. | 392/466 |
| 4,319,561 A | 3/1982 | Pei |
| 4,326,503 A | 4/1982 | Geier et al. |
| 4,346,694 A | 8/1982 | Moan |
| 4,394,859 A | 7/1983 | Drost |
| 4,409,964 A | 10/1983 | Shimada et al. |
| 4,452,233 A | 6/1984 | Goodman, Jr. et al. |
| 4,474,169 A | 10/1984 | Steutermann |
| 4,554,908 A | 11/1985 | Hanlet et al. |
| 4,579,107 A | 4/1986 | Deakin |
| 4,719,968 A * | 1/1988 | Speros | 165/154 |
| 4,848,087 A | 7/1989 | Parker et al. |
| 4,987,883 A | 1/1991 | Watkins et al. |
| 5,555,878 A | 9/1996 | Sparkman |
| 5,572,987 A | 11/1996 | Maratalla et al. |
| 6,637,427 B1 | 10/2003 | Yeomans |
| 6,712,069 B1 | 3/2004 | Spangler |
| 6,926,440 B2 * | 8/2005 | Litwin | 374/124 |
| 7,137,413 B2 | 11/2006 | Bauer et al. |
| 7,259,322 B2 | 8/2007 | Gronet |
| 7,296,410 B2 | 11/2007 | Litwin |
| 2008/0011290 A1 | 1/2008 | Goldman et al. |

* cited by examiner

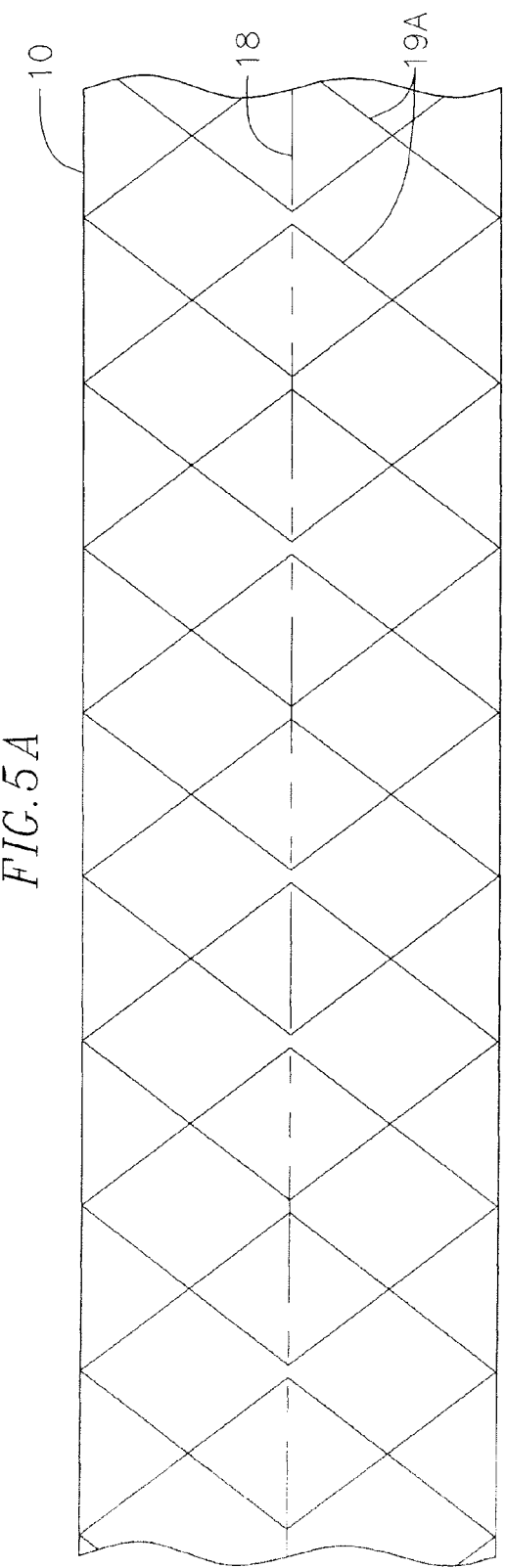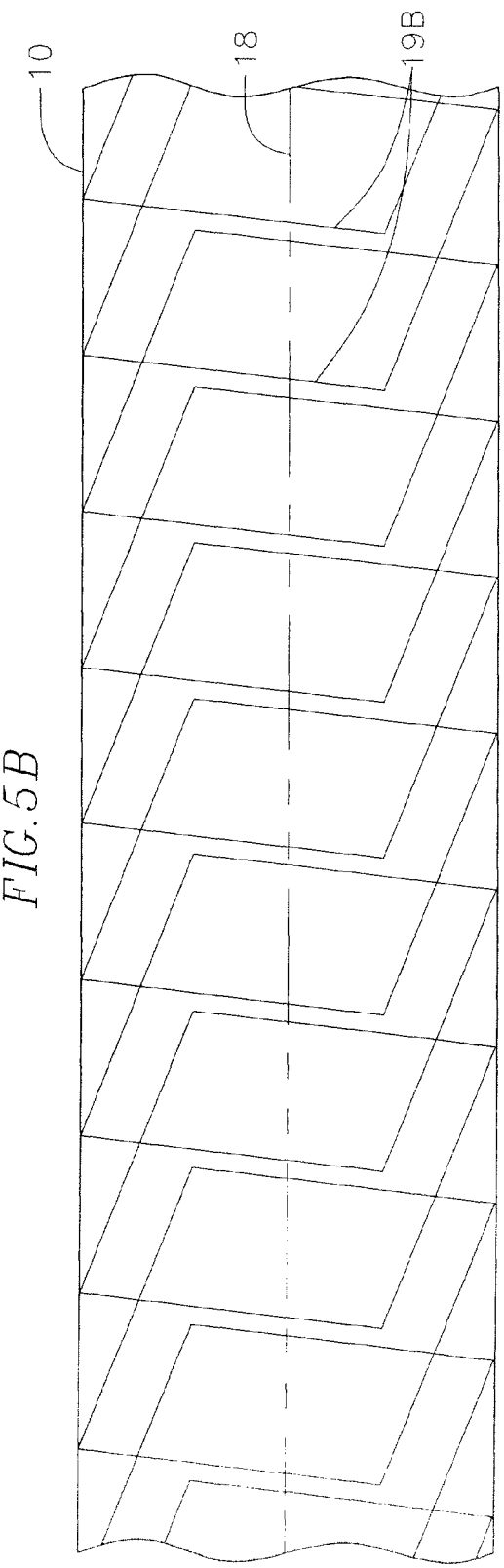

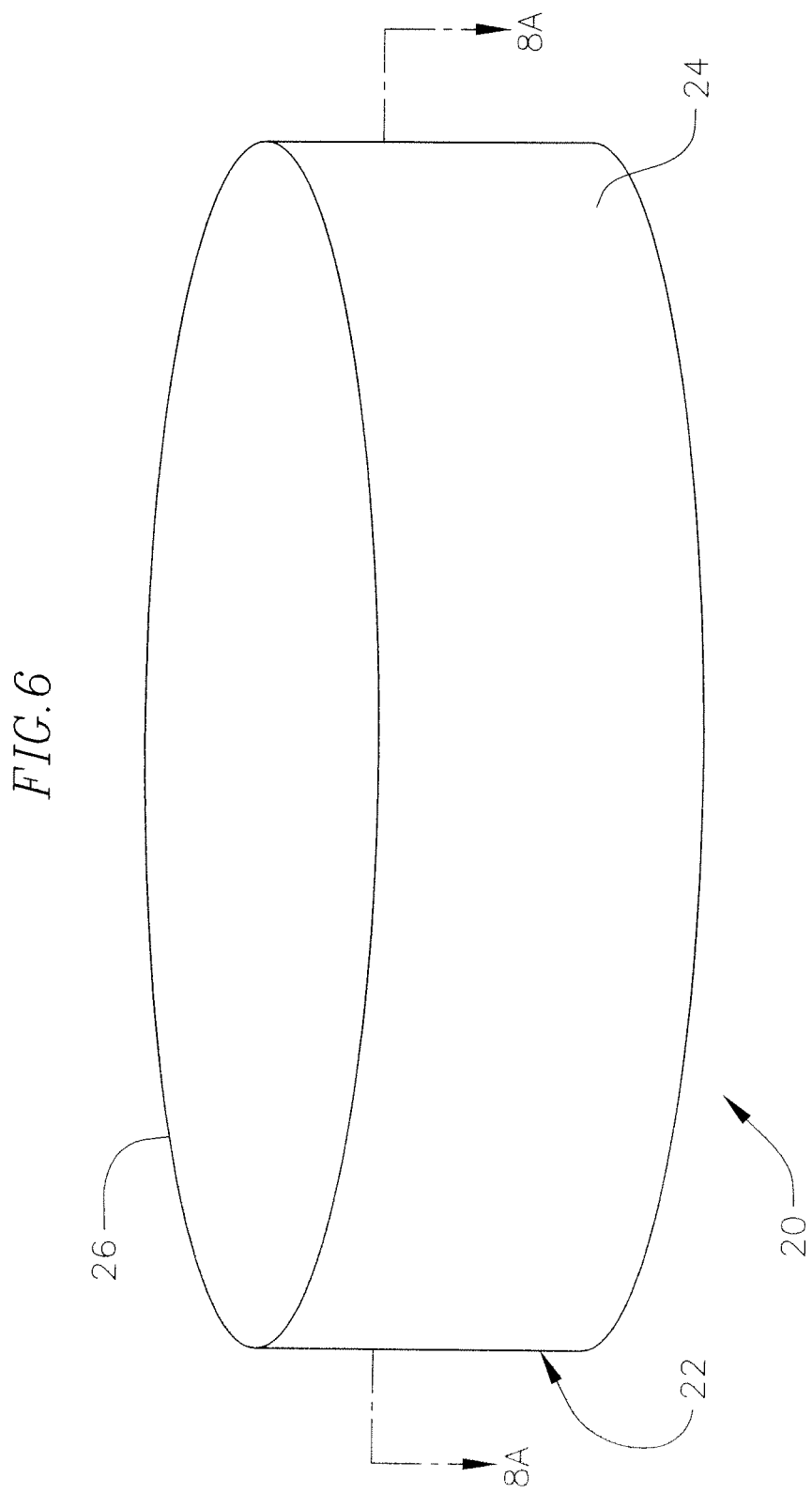

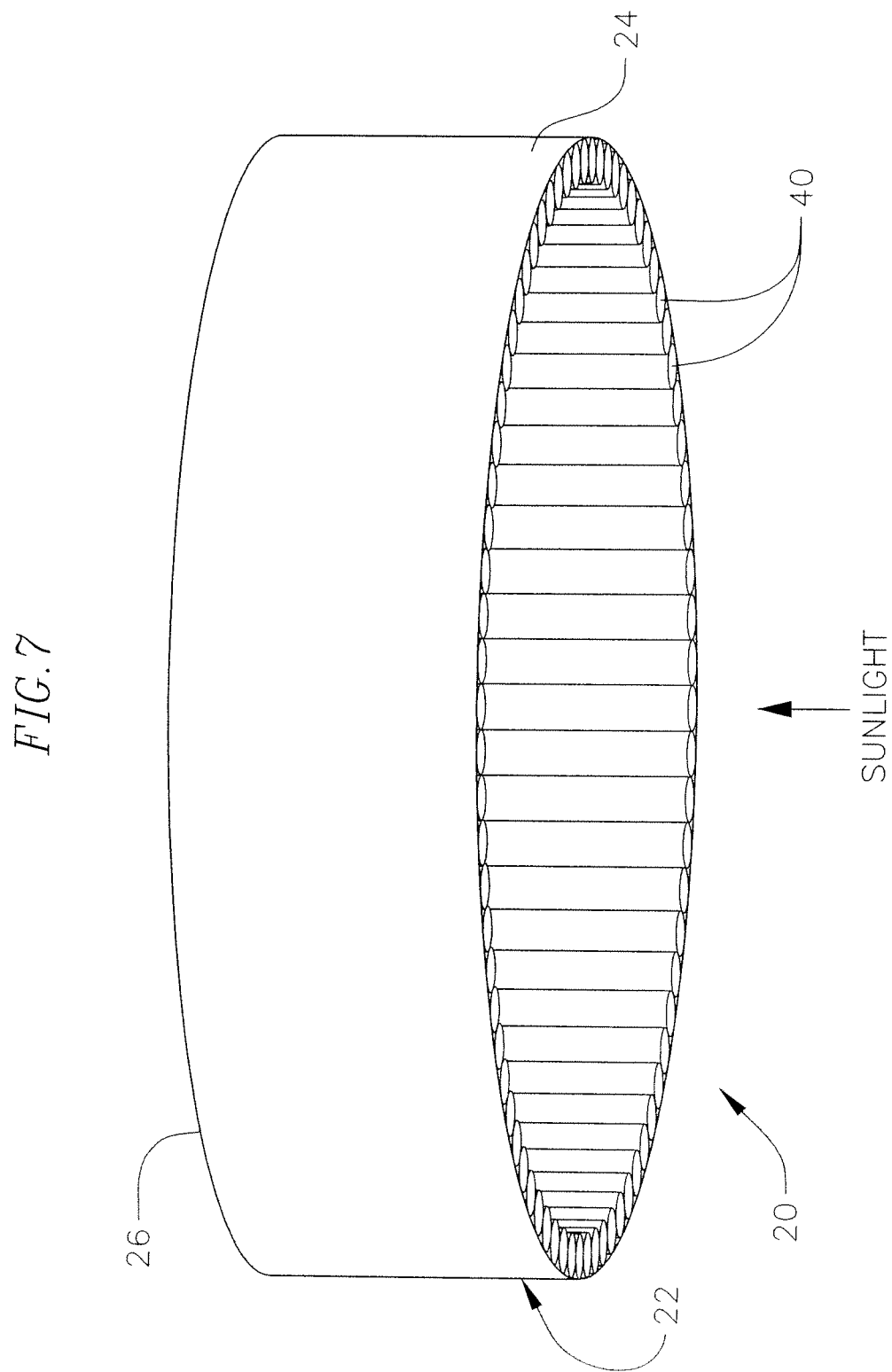

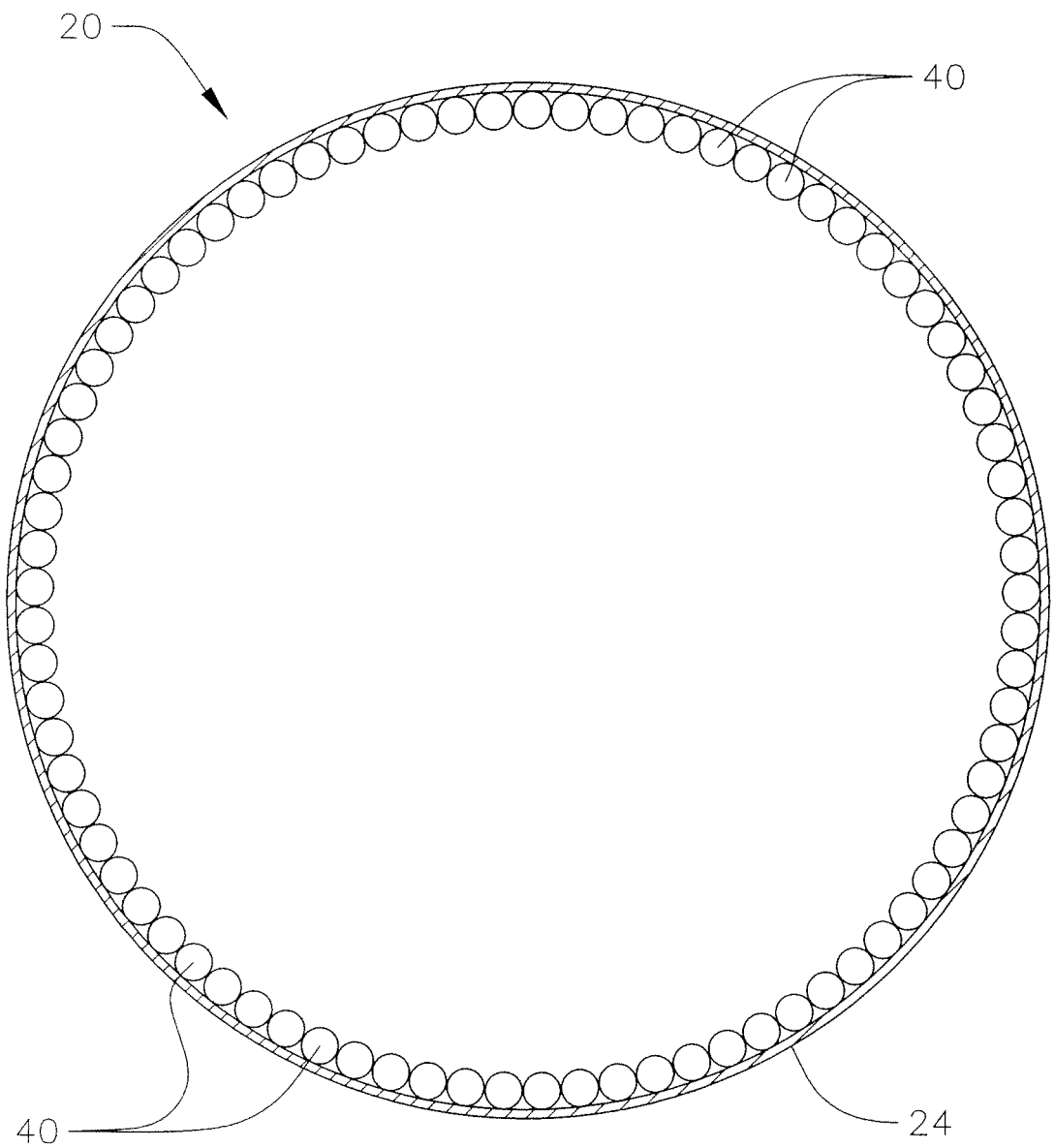

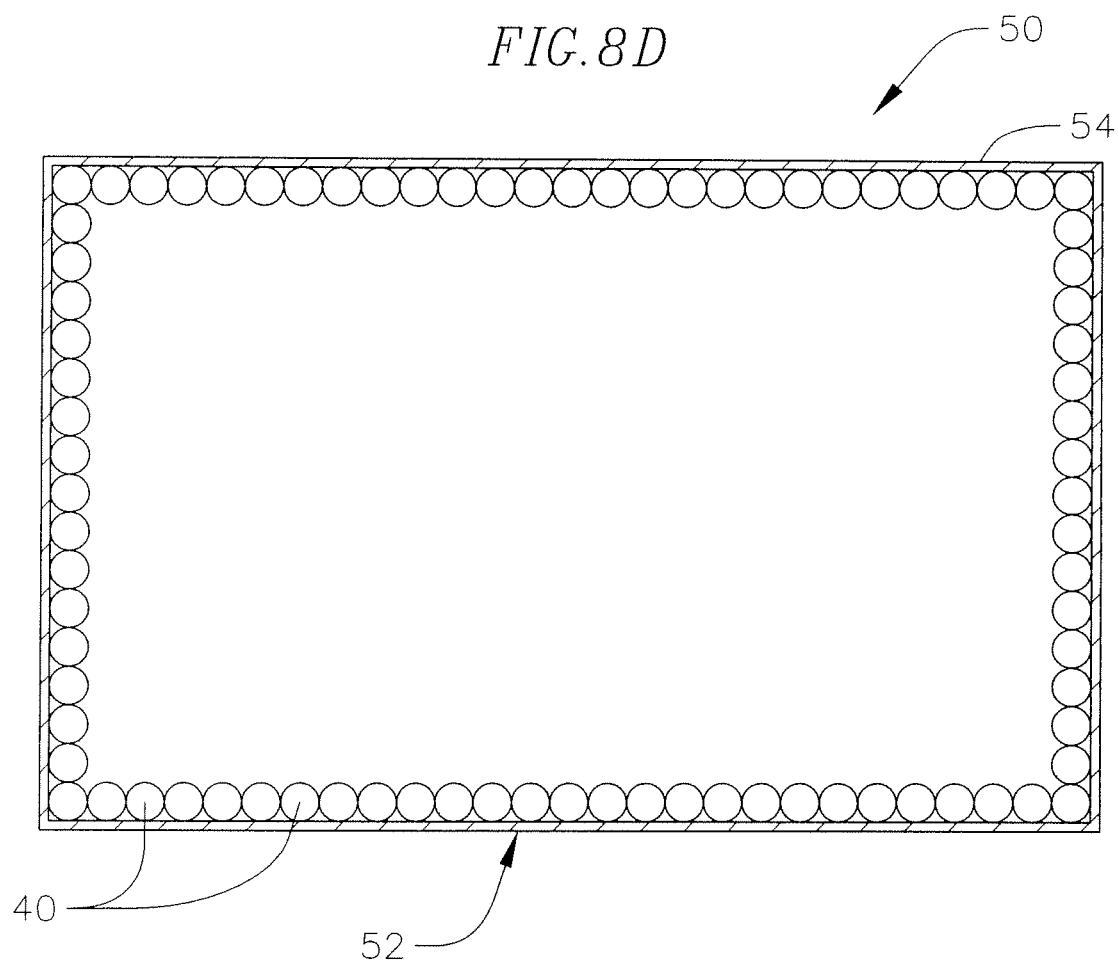

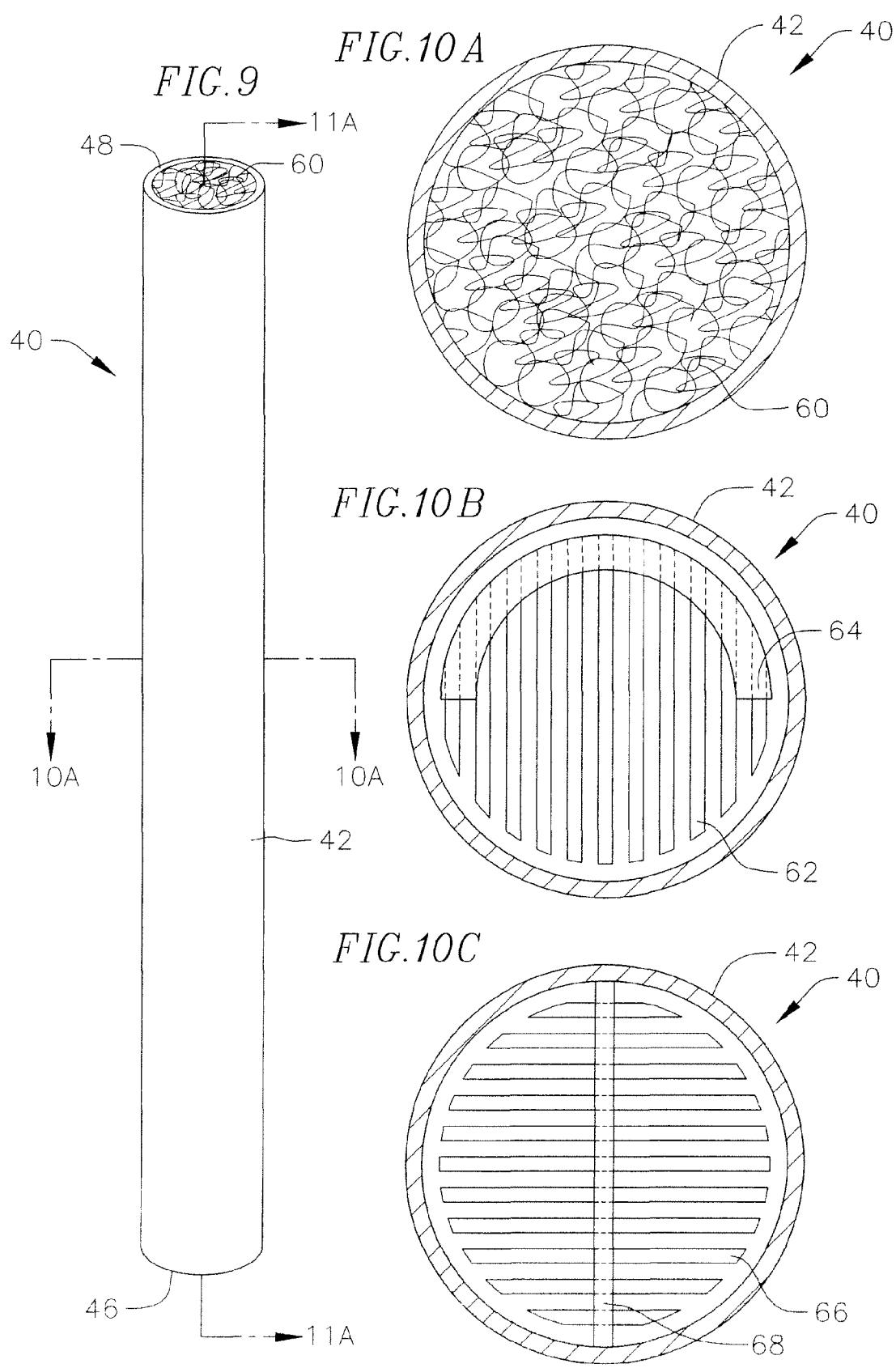

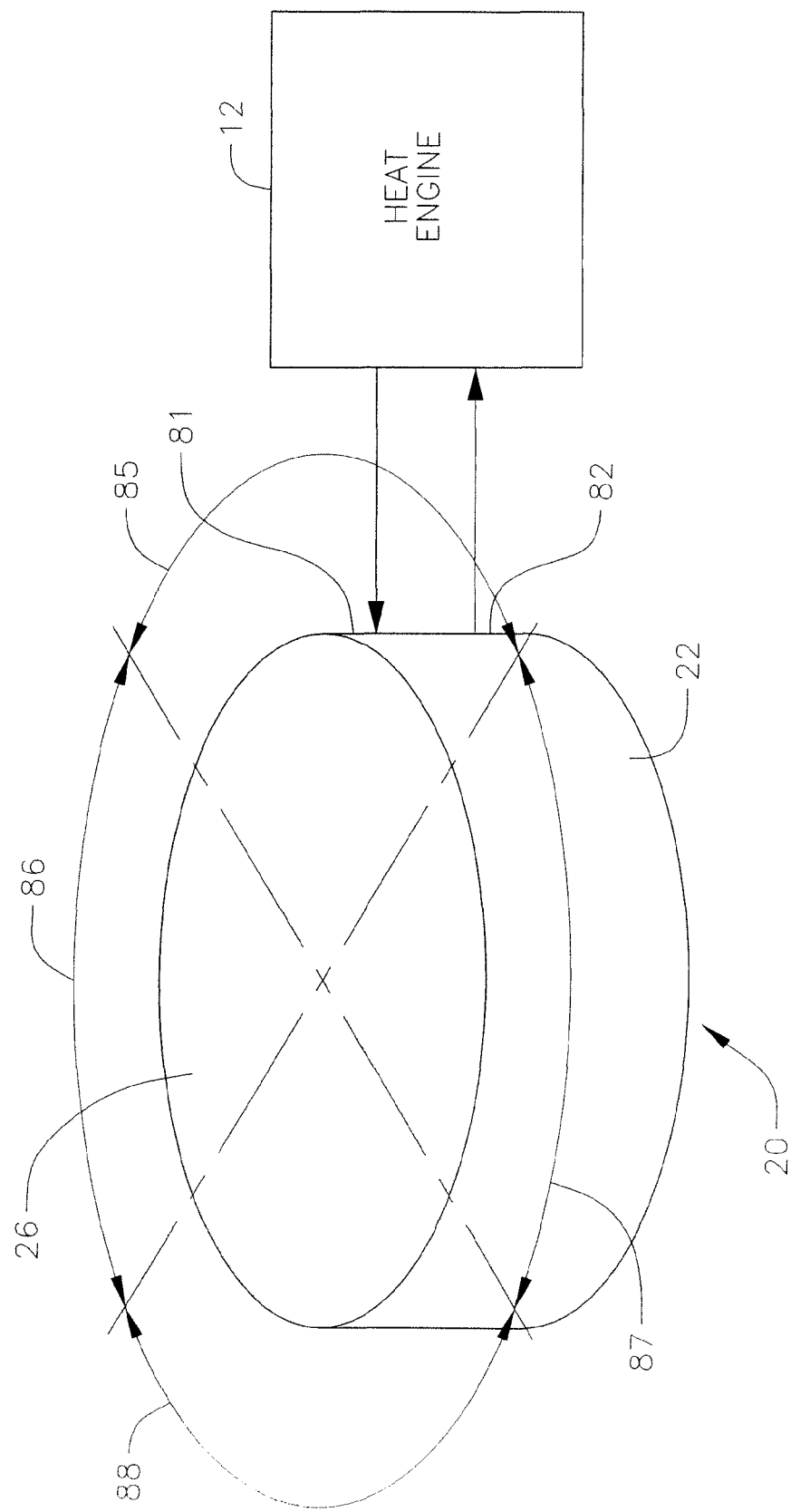

SOLAR THERMAL RECEIVER FOR MEDIUM- AND HIGH-TEMPERATURE APPLICATIONS

CROSS-REFERENCE TO RELATED APPLICATION(S)

This application claims priority to and the benefit of U.S. Provisional Application No. 61/072,297, filed on Mar. 28, 2008, the entire content of which is incorporated herein by reference.

FIELD OF THE INVENTION

The present invention relates to solar thermal energy, and more particularly to a heat receiver for harnessing solar thermal energy.

BACKGROUND

Solar thermal power systems use reflected sunlight as a heat source to drive electric generation. Solar thermal power is a clean, renewable power source, and does not have the degree of price volatility which accompanies many other fuel sources. The ability to deliver power during peak demand periods is an advantage making solar power an attractive energy technology, especially in many areas of the world having a warmer climate, such as the southwestern region of the United States. Further, solar thermal technology can be utilized as a significant contributor to a cogeneration/hybrid power facility.

Some heat receivers and systems have been utilized to collect and convert solar thermal energy into electricity, such as parabolic trough, power tower, and concentrating dish techniques. However, there are a number of improvements that are desirable over existing solar thermal systems. For example, existing solar thermal systems are costly to produce, install, operate, and/or maintain. Further, solar gas turbines have not been utilized beyond small demonstrations.

SUMMARY OF THE INVENTION

Aspects of embodiments of the present invention are directed toward a heat receiver for harnessing solar thermal energy. Embodiments of a heat receiver of the present invention are configured to collect and absorb solar thermal energy from sunlight directed at the heat receiver by one or more heliostats. As used herein, a "heliostat" may be interpreted broadly to include any concentrating solar collector. Another aspect of embodiments of the present invention is a heat receiver configured to heat a gas for recirculation to a gas turbine for generating electricity. Another aspect of embodiments of the present invention is a heat receiver configured to heat steam for recirculation to a steam turbine for generating electricity. Another aspect of embodiments of the present invention is a heat receiver including a plurality of tubes configured to harness solar thermal energy to make steam. Still another aspect of embodiments of the present invention is an elliptical heat receiver including a plurality of tubes for heating a gas for recirculation of the heated gas to a gas turbine. Still another aspect of embodiments of the present invention is a heat receiver including a plurality of tubes for heating a gas for recirculation of the heated gas to a gas turbine, wherein the plurality of tubes includes a plurality of structures or devices configured to absorb solar thermal energy.

According to one embodiment of the invention, a receiver system for harnessing solar radiation includes a receiver including one or more receiver elements, each receiver element including: a plurality of transparent tubes including a first tube and at least one second tube at least partially within the first tube; a first passage interposed between the first tube and the at least one second tube, the first passage having an inlet and an outlet; a second passage within the at least one second tube, the second passage having an inlet and an outlet; and an absorber in the at least one second tube, the absorber adapted to absorb the solar radiation.

In some embodiments, the at least one second tube is concentrically located within the first tube. Also, in some embodiments, the first tube includes a first transparent material, and the at least one second tube includes a second transparent material different from the first transparent material. In some embodiments, the receiver further includes a housing having at least one transparent portion, the housing configured to enclose the plurality of receiver elements, whereby a third passage is formed between the first tube and the housing.

According to another embodiment of the invention, a receiver system for harnessing solar radiation includes a receiver including a transparent front wall; an opaque back wall; one or more receiver elements between the front wall and the back wall; and a first passage interposed between the front wall and the back wall and outside of the one or more receiver elements, the first passage having an inlet and an outlet, wherein each of the receiver elements comprises a single transparent tube; a second passage within the tube, the second passage having an inlet and an outlet; and an absorber in the tube, the absorber adapted to absorb the solar radiation.

A heat receiver according to another embodiment of the present invention includes: a housing including an outer wall having an inner surface, an outer surface, a top edge, and a bottom edge; and a plurality of passages adjacent the inner surface of the outer wall, each of the plurality of passages having a first end, a second end, and a length extending between the first and second ends from near the bottom edge of the outer wall to near the top edge of the outer wall; wherein each of the plurality of passages is configured to provide a conduit for a gas to travel through the length of the passage.

In one embodiment, a heat receiver further includes insulating material adjacent the outer wall. In one embodiment, the housing of a heat receiver further includes an inner wall having an inner surface, an outer surface opposite the inner surface of the outer wall, a top edge, and a bottom edge; the outer surface of the inner wall and the inner surface of the outer wall are spaced apart to form an interior housing wall region between the inner wall and the outer wall; and the plurality of passages is in the interior housing wall region. In one embodiment, the heat receiver further includes a roof above and connected to the inner wall. In one embodiment, the inner wall includes fused silica. As referenced herein, "fused silica" may be substituted by fused quartz. In one embodiment, the housing of the heat receiver includes graphite.

In one embodiment, a heat receiver further includes a plurality of tubes having an internal cavity, wherein the internal cavities of the plurality of tubes include the plurality of passages. In one embodiment, the plurality of tubes includes a plurality of fused silica tubes.

In one embodiment, a heat receiver further includes a plurality of heat absorbers in the plurality of passages. In one embodiment, the plurality of heat absorbers includes a plurality of silicon carbide heat absorbers. In one embodiment, the plurality of heat absorbers includes a plurality of elongated strands. In one embodiment, the plurality of elongated strands fills between approximately 1 percent and approximately 20 percent of the volume of each of the plurality of passages. In one embodiment, the plurality of elongated strands fills approximately 10 percent of the volume of each of the plurality of passages. In one embodiment, the plurality of elongated strands includes a plurality of silicon carbide elongated strands. The present invention is not limited to any particular embodiment.

In one embodiment, a heat receiver further includes a plurality of outer tubes having an internal cavity; and a plurality of inner tubes within the internal cavities of the outer tubes, each of the plurality of inner tubes having an internal cavity, wherein the internal cavities of the plurality of inner tubes include the plurality of passages. In one embodiment, the heat receiver further includes a plurality of heat absorbers in the plurality of passages. In one embodiment, the plurality of heat absorbers includes a plurality of elongated strands.

In one embodiment, a heat receiver further includes a plurality of inlet headers coupled to the first ends of the plurality of passages and configured to provide an opening for the gas to enter each of the plurality of passages, the gas entering at a first temperature; and a plurality of outlet headers coupled to the second ends of the plurality of passages and configured to provide an opening for the gas to exit each of the plurality of passages, the gas exiting at a second temperature, the second temperature greater than the first temperature. In one embodiment, each of the plurality of inlet headers is adjacent the top edge of the outer wall; each of the plurality of outlet headers is adjacent the bottom edge of the outer wall; and the heat receiver further comprises an outlet plenum connected to each of the plurality of outlet headers.

BRIEF DESCRIPTION OF THE DRAWINGS

These and other features and aspects according to exemplary embodiments of the present invention will become better understood in reference to the following description, appended claims, and accompanying drawings where:

FIGS. 5A-B are diagrams of possible patterns of solar thermal energy received by the heat receiver of FIG. 4;

FIG. 6 is a top perspective view of a heat receiver according to an embodiment of the present invention;

FIG. 7 is a bottom perspective view of the heat receiver of FIG. 6;

FIG. 8A is a simplified sectional view through the heat receiver of FIG. 6 taken at line 8A-8A;

FIG. 8D is a simplified top sectional view of a heat receiver according to another embodiment of the present invention;

FIG. 9 is a top perspective view of a tube of the heat receiver of FIG. 6;

FIG. 10A is a sectional view through the tube of FIG. 6 taken at line 10A-10A;

FIG. 10B is a sectional view of a tube of a heat receiver according to another embodiment of the present invention;

FIG. 10C is a sectional view of a tube of a heat receiver according to another embodiment of the present invention;

FIG. 12 is a schematic diagram of a heat receiver according to the present invention connected to a heat engine;

DETAILED DESCRIPTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
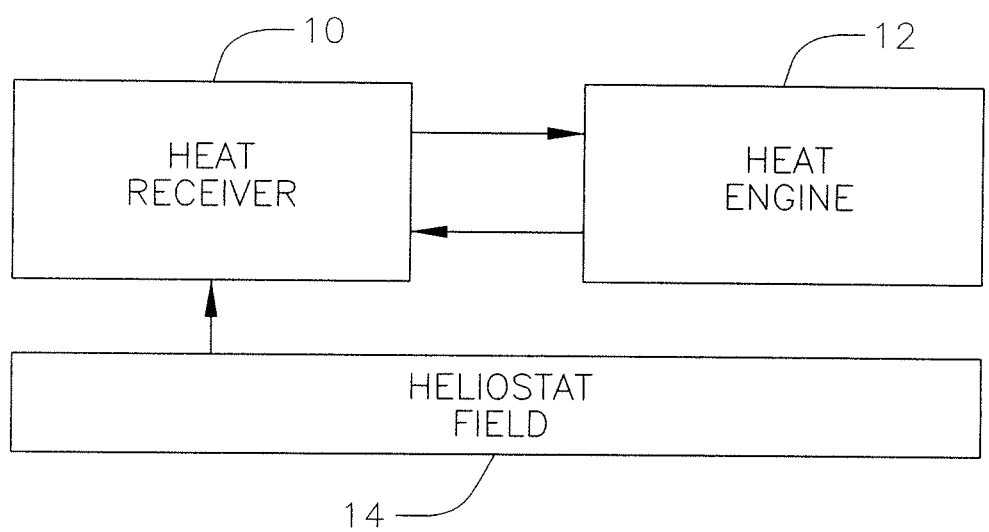
FIG. 1 is a block diagram including a heat receiver according to the present invention.

With reference to FIG. 1, an embodiment of a heat receiver 10 ("solar gas receiver") is configured to be utilized with a heat engine 12 and a heliostat field 14. In a described embodiment, the heat engine 12 is a gas turbine configured to generate electricity from heated gas. In other embodiments, the heat engine 12 may be a steam turbine configured to generate electricity from steam. Those skilled in the art would appreciate that the working fluid passages (e.g., steam or gas passages) in the heat receiver 10 for steam turbine applications should withstand more pressure as compared with a heat receiver for gas turbine applications. The heliostat field 14 includes one or more heliostats configured to reflect and direct sunlight toward the heat receiver 10. The heliostat field 14 may include any suitable reflecting devices or combination thereof. Further, the heliostat field 14 may include any suitable number of heliostats.

Figure 2:
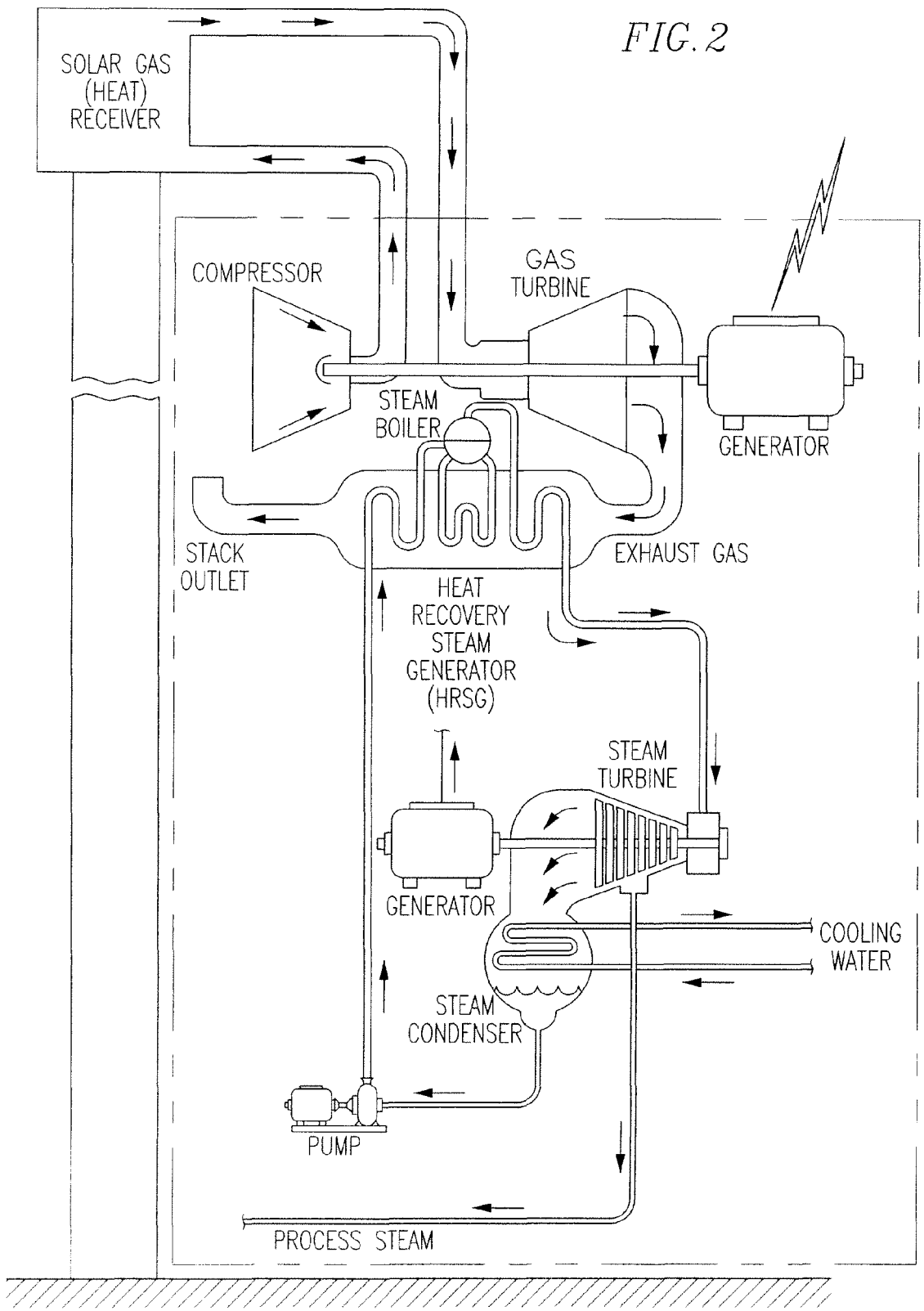
FIG. 2 is a system diagram including a heat receiver according to the present invention.

With reference to FIG. 2, a heat receiver ("solar gas receiver"), according to an embodiment of the present invention, may be a component of a system for generating electricity. The system, according to one embodiment as illustrated in FIG. 2, is a combined cycle system including each of a gas turbine and a steam turbine. The system may include a heat recovery steam generator (HRSG) configured to receive exhaust gas from the gas turbine and heat steam to drive the steam turbine. The system has two generators, one connected to each of the gas turbine and the steam turbine, for generating electricity. A system for generating electricity including a heat receiver, according to other embodiments, may include one or more additional components, or may omit one or more of the above components without departing from the present invention.

As can be seen in FIG. 2, the compressor provides compressed gas into the heat receiver, which heats the gas and provides the heated gas to turn gas turbine coupled to a first generator to generate electricity. The exhaust gas is then applied to the steam boiler of a heat recovery steam generator (HRSG) to generate steam prior to being removed via the stack outlet. This way, the heat energy of the exhaust gas is recovered. The steam is provided to a steam turbine coupled to a second generator to generate additional electricity. As such, using the combined gas/steam cycle, the electricity generation efficiency of the system is improved.

A heat receiver ("solar gas receiver"), according to other embodiments of the present invention, may be a component of an alternative system for generating electricity. For example, a heat receiver may be part of a system that is not a combined cycle system, as described above and illustrated in FIG. 2, but rather includes only one turbine or heat engine and one generator for generating electricity. Alternatively, a heat receiver according to an embodiment of the present invention may be an elliptical heat receiver including steam tubes and coupled directly to a steam turbine, for example.

Figure 3:
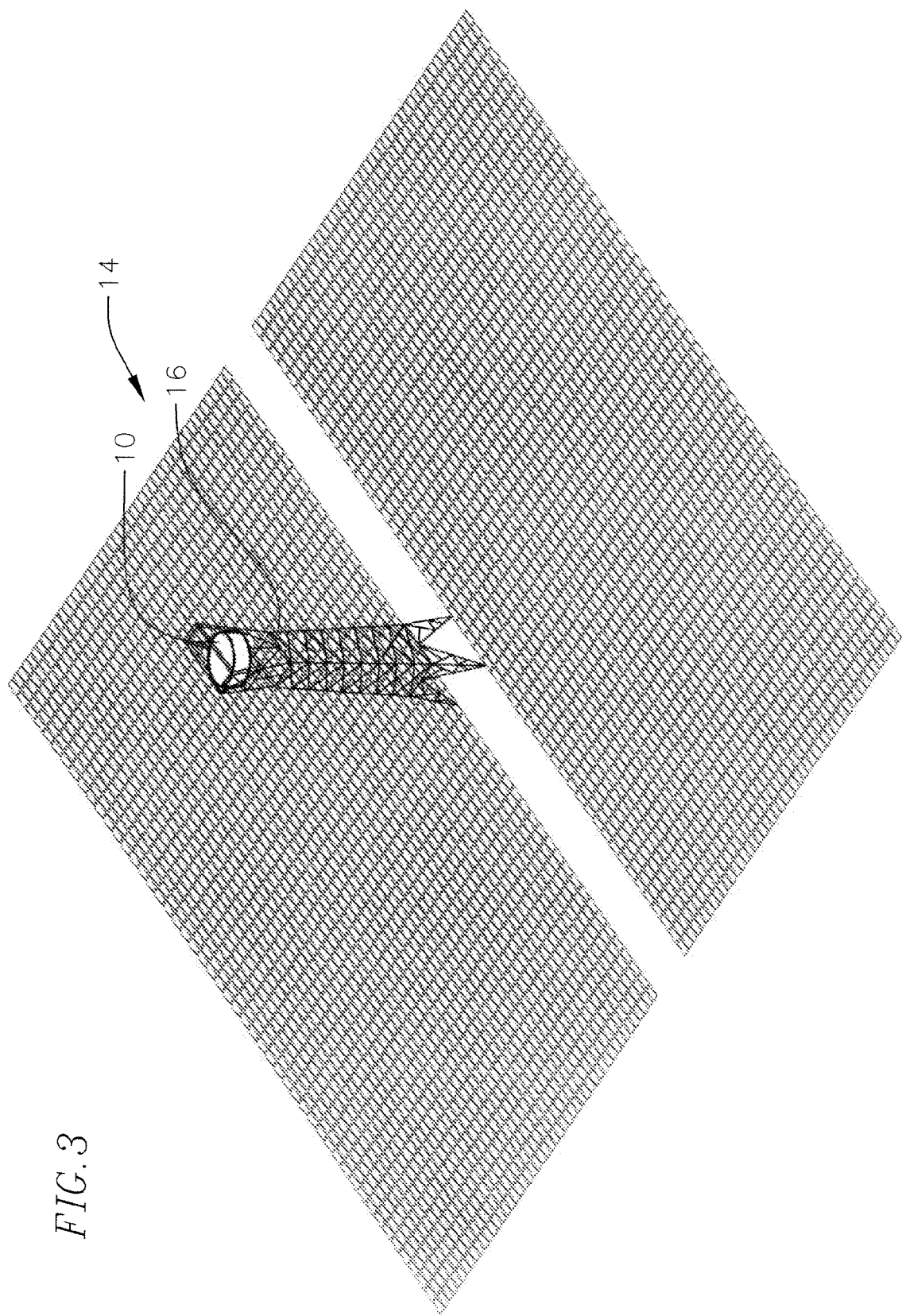
FIG. 3 is a perspective view of a heat receiver according to the present invention, the heat receiver positioned to receive solar thermal energy from a field of heliostats.

With reference to FIG. 3, the heat receiver 10, in the present embodiment, is configured to be mounted on a heat receiver tower 16 above the heliostat field 14. The heat receiver tower 16 may include a relatively open structure, such as a truss, configured to provide open space through which a great amount of sunlight may pass unobstructed to the heat receiver 10. In one embodiment, the heat receiver tower 16 may be a dual monopole tower having two poles configured to support the heat receiver 10 at two opposite portions of the perimeter of the heat receiver 10 (e.g., the two ends of a minor diameter of an elliptical perimeter). Further, the heat receiver 10 may be broken into halves or other portions, and the portions separated such that the two poles of the heat receiver tower 16 do not obstruct reflected sunlight directed at the heat receiver 10.

The height of the heat receiver tower 16 may be optimized for efficiency and/or cost considerations (e.g., such that the amount of solar thermal energy directed by the heliostat field 14 is not substantially dissipated in the surrounding ambient air). The height of the heat receiver tower 16 may also be chosen based on other considerations, such as aviation and/or environmental permitting rules. Additionally, the horizontal distance from the heat receiver 10 to the heliostats of the heliostat field 14 may also be optimized for efficiency, cost, and/or other considerations. In one embodiment, the heat receiver 10 is located at a horizontal distance from the nearest heliostat of the heliostat field 14 of between approximately two and approximately three times the height of the heat receiver tower 16. Of course, this distance can be different in other embodiments.

Further, while the heliostat field 14 is depicted in FIG. 3 as having a rectangular shape/configuration, the present invention is not limited thereto. Moreover, the sizes and relative positions and orientations of the heat receiver 10, the heliostat field 14, and the heat receiver tower 16 are not drawn to scale in FIG. 3. For example, the heat receiver 10, according to some embodiments, is not located in the center of the heliostat field 14. Also, for example, according to some embodiments, a bottom edge of the heat receiver 10 is not substantially parallel to the ground (i.e., the heat receiver 10 may be tilted at various angles).

Figure 4:
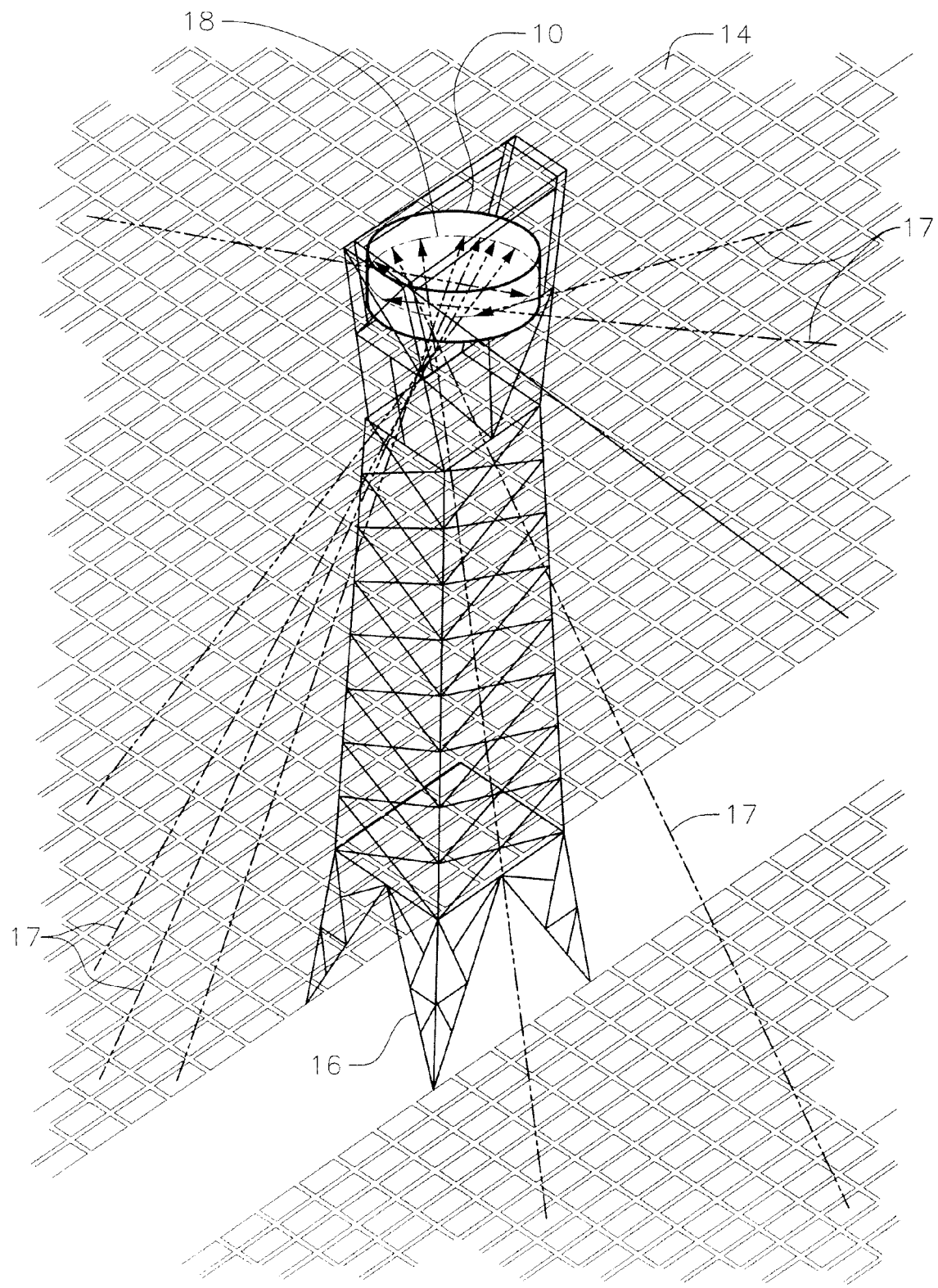
FIG. 4 is a perspective view of a heat receiver according to the present invention, the heat receiver receiving solar thermal energy from a field of heliostats.

With reference to FIG. 4, in one embodiment, the heat receiver 10 and the heliostats of the heliostat field 14 are configured such that sunlight is reflected by the heliostats 14, directed along reflection lines 17 toward the heat receiver supported above the heliostat field 14 on the heat receiver tower 16, and concentrated substantially uniformly along a substantially horizontal concentration line 18 on an inner surface of a wall of the heat receiver 10. In one embodiment, as depicted in FIG. 4, each of the heliostats of the heliostat field 14 is configured to direct sunlight at a different portion of the concentration line 18 than that of the other heliostats. Further, each of the heliostats of the heliostat field 14 may be configured to continuously direct sunlight at a particular portion of the concentration line 18 while the direction of sunlight moves relative to the heliostat throughout the day.

With reference to FIGS. 5A and 5B, the heat receiver 10 is depicted, for the purpose of illustration, as if it were cut along a wall and "unrolled," so that an inside surface of the wall is shown as a flat sheet, rather than a elliptical or round inner surface of the three-dimensional heat receiver 10. The concentration line 18, where the heliostats of the heliostat field 14 are configured to direct reflected sunlight is approximately at a center line of the inner surface of the wall (i.e., approximately equidistant from a top edge of the inner surface of the wall and a bottom edge of the inner surface of the wall). Further, FIGS. 5A and 5B depict reflection zones 19A, 19B, each of which is an area of the inner surface of the wall of the heat receiver 10 where one of the heliostats of the heliostat field 14 reflects sunlight.

The heat receiver 10 and the heliostats of the heliostat field 14 are configured such that the reflection zones 19A, 19B are regularly spaced from each other and cover a majority of the inner surface of the wall of the heat receiver 10, as shown in FIGS. 5A and 5B. The reflection zones 19A, 19B may have diamond-shaped or parallelogram-shaped areas, as shown in FIGS. 5A and 5B, respectively, or any other trapezoidal or suitably shaped area. Further, while the reflection zones 19A, 19B are depicted in FIGS. 5A and 5B as having regular shapes and well-defined boundaries (i.e., diamonds and parallelograms), the reflection zones 19A, 19B may be more irregular and the boundaries less well-defined.

The configuration described above having substantially regularly-spaced reflection zones 19A, 19B covering a majority of an inner surface of the wall of the heat receiver 10 may be advantageous when utilized in conjunction with an elliptical heat receiver 10. The elliptical heat receiver 10, in one embodiment, has a plurality of steam boiler tubes arranged around the perimeter of the wall of the heat receiver adjacent the inner surface where the reflection zones 19A, 19B are provided. The heliostats of the heliostat field 14 may be configured to track an orientation of the sun, such that throughout a day, the reflection zones 19A, 19B around the perimeter of the inner wall of the heat receiver 10 remain uniform, as described above. The steam boiler tubes, in one embodiment, are formed of carbon steel and connected together by carbon steel webs. Alternatively, the boiler tubes may be formed of stainless steel, a high-temperature alloy, or any other suitable material. The patterns of reflection zones 19A, 19B described above may, for example, provide a substantially uniform flux of solar thermal energy to the steam boiler tubes and thereby are exposed to lower and more uniform stresses. Additionally, because each of the boiler tubes receives a substantially equal amount of solar thermal energy and expands or contracts by a substantially equal amount as a result, the webs connecting the boiler tubes are also exposed to lower stresses.

With reference to FIG. 6, in one embodiment according to the present invention, a heat receiver 20 includes a housing 22 having an outer wall 24. The housing 22 is configured to capture and retain sunlight and solar thermal energy reflected therein. In one embodiment, the outer wall 24 of the housing 22 has an elliptical shape. In other embodiments, the perimeter of the outer wall 24 may be circular, rectangular, or any other suitable shape. The housing 22, in one embodiment is formed of sheet metal, such as carbon steel, aluminum, or another suitable material. Additionally, an outer surface of the outer wall 24 may be painted or otherwise treated to protect against corrosion. Also, in some embodiments, an insulating material may be applied on an outer surface of the outer wall 24. The insulating material (not shown) may be a foam sprayed on the outer wall 24, or alternatively, the insulating material may be sandwiched between the outer wall 24 and an outer casing, also formed of carbon steel, aluminum, or another suitable material.

In the present embodiment, the heat receiver 20 also includes a roof 26 on the housing 22. The roof 26 is configured to absorb and/or retain heat in the heat receiver 20. The roof 26 may also be configured to deter precipitation from entering the heat receiver 20, or otherwise protect the heat receiver 20 from the environment. In one embodiment, the roof 26 is formed of the material of the outer wall 24, such as carbon steel or aluminum sheet metal, for example. Also, as described above with respect to the outer wall 24, the heat receiver 20 may include insulating material adjacent the roof 26.

With reference to FIG. 7, in one embodiment according to the present invention, the heat receiver 20 includes a plurality of tubes 40 arranged along an inner periphery of the outer wall 24. In the present embodiment, the tubes 40 are fused silica tubes. In one embodiment, the tubes 40 are arranged, as shown in FIG. 7, in a single row along the inner periphery of the outer wall 24. In other embodiments, the tubes 40 may be stacked in two or more rows or layers toward the center of the heat receiver 20. In still other embodiments, the tubes may be stacked in a staggered configuration of two or more rows or layers wherein the tubes on different layers are not aligned in the radial direction from the outer wall 24 toward the center, and instead, each tube 40 of the upper layer is located between two tubes 40 of the lower layer along a direction tangential to the outer wall 24.

In a present embodiment, the tubes 40 are made of a transparent material that allows sunlight to pass therethrough, such as glass, fused silica glass, or fused quartz. In other embodiments, the tubes 40 may be steam pipes, formed of carbon steel or an alternative suitable material.

In some embodiments, the housing 22 may also include an inner wall (not shown) on the inner side of one or more layers of the tubes 40, such that the tubes 40 are between the outer wall 24 and the inner wall. The inner wall is made of glass, fused silica, or another suitable transparent material such that reflected sunlight passes through the inner wall and the tubes 40 to heat a heat transfer medium, such as air, helium, or any other suitable gas or heat transfer medium, inside the tubes 40.

Figure 8B:
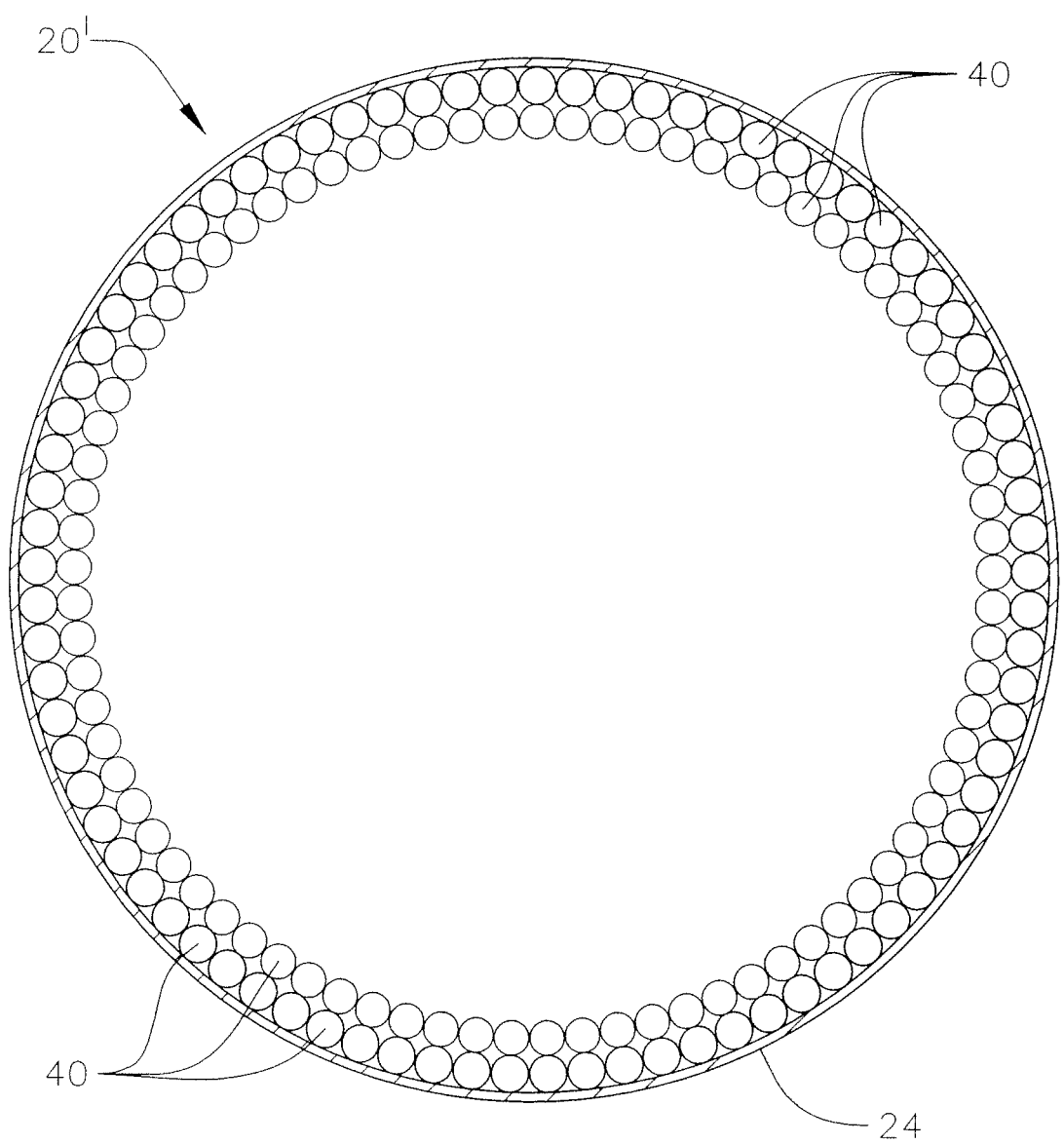
FIG. 8B is a simplified top sectional view of a heat receiver according to another embodiment of the present invention.
Figure 8C:
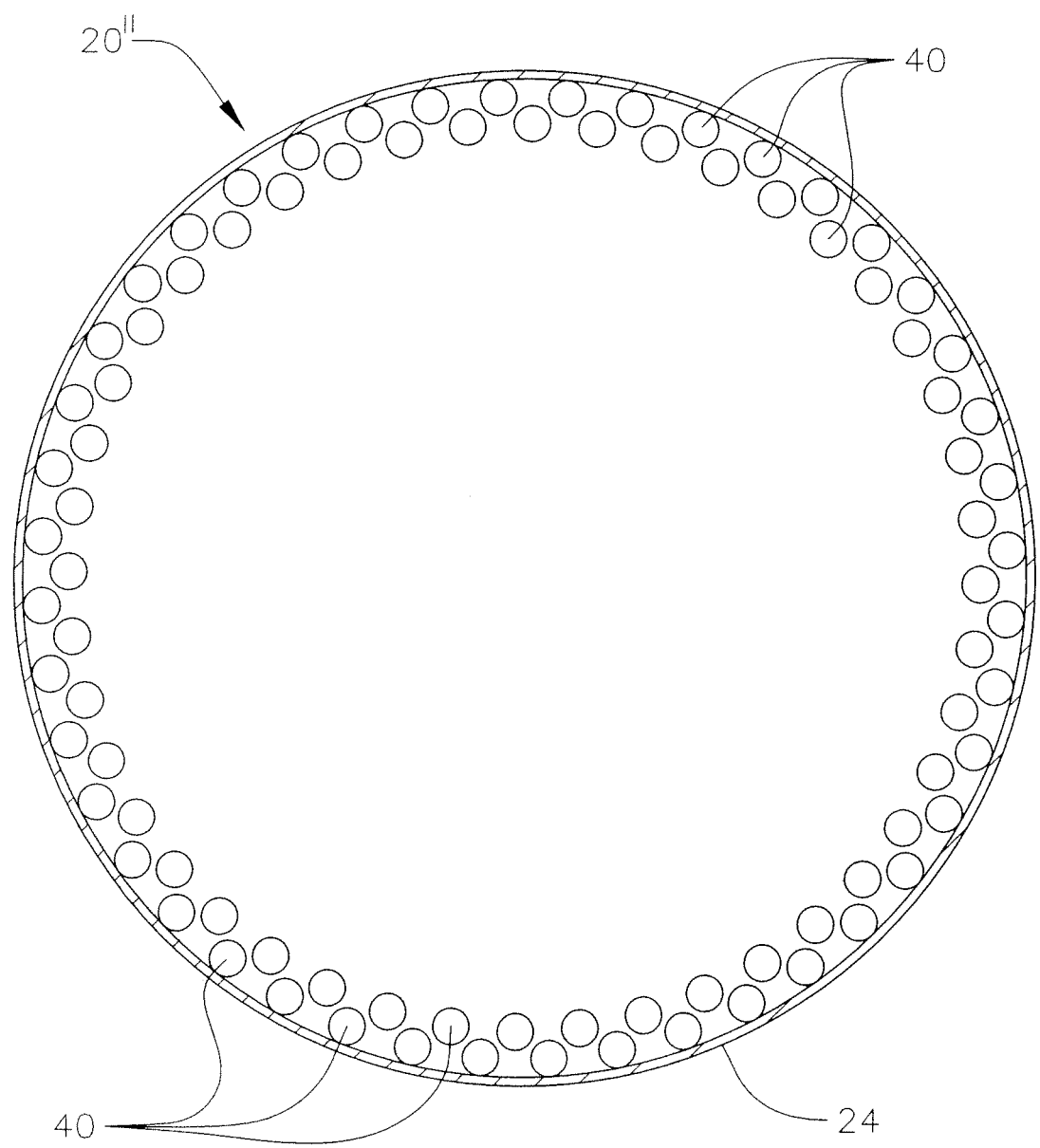
FIG. 8C is a simplified top sectional view of a heat receiver according to another embodiment of the present invention.

With reference to FIGS. 8A-D, the tubes 40 of the heat receiver 20 may be positioned adjacent the outer wall 24 of the housing 22 according to various embodiments. As shown in FIGS. 8A-C, in these embodiments, a section through the heat receiver 20 has a circular shape. In other embodiments, a section through the heat receiver 20 may have an elliptical shape, any suitable polygonal shape, or any other suitable shape as those skilled in the art would appreciate.

As shown in FIG. 8A, the tubes 40 may be positioned adjacent each other in a single row around the inside perimeter of the outer wall 24. In another embodiment, as shown in FIG. 8B, the tubes 40 are arranged in two rows (or layers) around the inside perimeter of the outer wall 24. Such an arrangement provides increased surface area for collecting sunlight in the tubes 40. In another embodiment, as shown in FIG. 8C, the tubes 40 are arranged in two staggered rows (or layers) around the inside perimeter of the outer wall 24. Alternatively, the tubes 40 may be arranged in any other number of rows (or layers) or other patterns suitable for capturing a desirable amount of sunlight entering the heat receiver 20, 20' or 20".

With reference to FIG. 8D, a heat receiver 50 according to another embodiment has a housing 52 having a section having a rectangular shape/perimeter. The tubes 40 adjacent an outer wall 54 of the housing 52 are correspondingly positioned in a rectangular pattern. Similar to the embodiments of FIGS. 8A-C, the tubes 40 in other embodiments may have two or more rows (layers) and may be configured in various different configurations (e.g., a staggered configuration). In other embodiments, the housing 52 and the pattern of tubes 40 may have various other suitable shapes.

With reference to FIG. 9, each of the tubes 40 is an elongated tube having a wall 42 surrounding an internal cavity. The internal cavity extends through the length of the tube 40, from a first end 46 of the tube 40 to a second end 48 of the tube 40. In the described embodiment, the tubes 40 are cylindrical, and the internal cavities are also cylindrical. The wall 42 has a substantially uniform thickness from the first end 46 to the second end 48. In alternative embodiments, the tubes 40 and/or the internal cavities may have various shapes, rather than cylinders.

The tubes 40, in the described embodiment, are formed of fused silica. Fused silica provides strength to the tubes 40 at high temperatures so that the tubes 40 are configured to house high-temperature gases at high pressures. For example, the fused silica tubes 40 can withstand internal pressures between about 40 and about 350 pounds per square inch that may be required for operation with a gas turbine engine. Further, the fused silica tubes 40 are very resistant to thermal shock; in fact, the fused silica tubes 40 generally tend to increase in material strength at higher temperatures. In addition, the fused silica tubes have a very low coefficient of expansion of approximately $0.55 \times 10^{-6}$ inch/inch-degree Kelvin, such that they are relatively immune to size increases at high temperatures. Alternatively, the tubes 40 may be formed of any other suitable material, such as fused quartz.

With reference to FIGS. 10A-10D and 11A-11D, the tubes 40, according to the present embodiment, include heat absorbers (or radiation absorbers) in the internal cavities of the tubes 40. The heat absorbers are configured to absorb solar radiation incident on the tubes 40 and to transfer the absorbed energy as thermal energy to a gas flowing in the tubes 40. As shown in FIGS. 10A-10D and 11A-11D, the heat absorbers may include one or more of various possible embodiments. In the described embodiments, the heat absorbers fill between approximately 1 percent and approximately 20 percent of the volume of each of the tubes 40. Further, in the described embodiments, a ratio of a surface area of the heat absorbers to a frontal area (i.e., an inner diameter of the tubes 40 multiplied by a total length of the tubes 40) is between approximately 6:1 and approximately 20:1. However, these design parameters are not to be understood as limiting the invention thereto, as those skilled in the art would understand that alternative embodiments of the invention may include design parameters outside of the ranges discussed above.

Figure 10D:
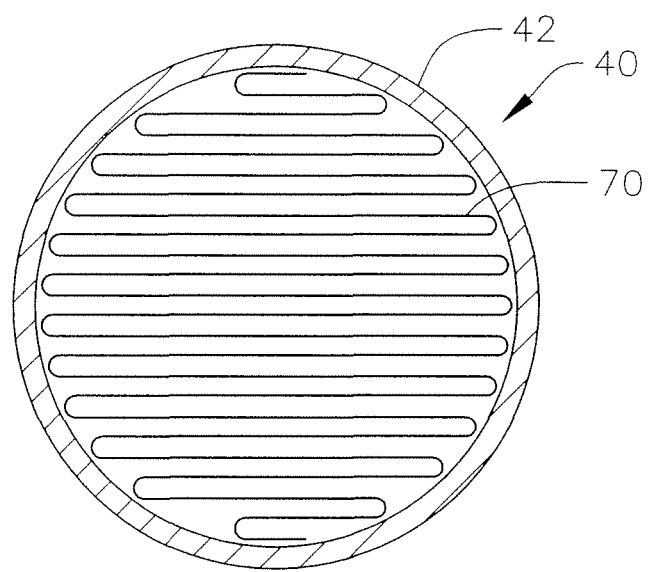
FIG. 10D is a sectional view of a tube of a heat receiver according to another embodiment of the present invention.
Figure 11A:
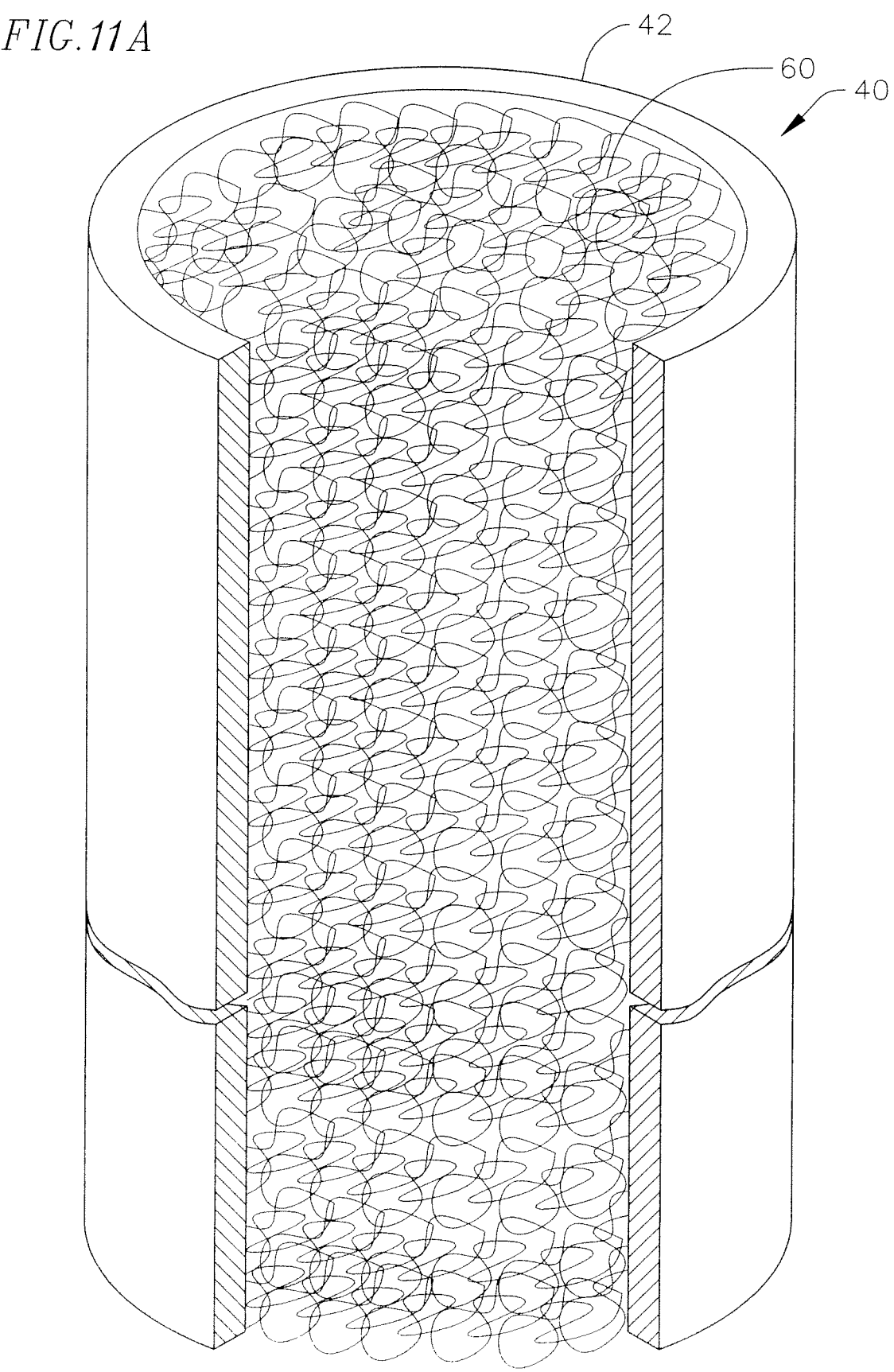
FIG. 11A is a perspective sectional view through the tube of FIG. 6 taken at line 11A-11A.

With reference to FIGS. 10A and 11A, according to one embodiment, the tubes 40 have heat absorbers therein, including elongated strands 60 having a pseudo-random geometry, such as a geometry having the appearance of spaghetti, for example. The elongated strands 60 of the heat absorbers have a large amount of surface area for providing heat absorption capacity. Further, the heat absorber structures are porous. That is, there is ample space between the elongated strands 60 for allowing a heat transfer medium, such as air or another gas, to flow between the elongated strands 60. According to one embodiment, for example, the elongated strands 60 fill between about 1 percent and about 20 percent of the inside volume of the tubes 40. The elongated strands 60 may be formed of silicon carbide or a suitable high-temperature alloy or high-temperature ceramic, for example, or any other suitable material. Further, the elongated strands 60 of the heat absorbers may include paint, coating, or other exterior treatment providing the exterior of the absorbers with a black coloring or other opaque or suitable exterior for increasing absorption of incident radiation. For example, in one embodiment, the absorber has an exterior finish having a solar radiation absorption coefficient between about 0.5 and 1.

The elongated strands 60 comprising each of the heat absorbers may be formed of a continuous wire or strand that is folded over on itself, using any suitable apparatus. That is, in one embodiment, a heat absorber is formed of a spun wire having a continuous length in a longitudinal direction, as opposed to a sheet or screen configuration. Further, the elongated strands 60 may be folded to have either a regular or irregular pattern of folds so that the heat absorber has voids between the elongated strands 60 in a ratio as described above. These voids provide the space for a heat exchange medium, such as air, to pass through the tubes 40 and the elongated strands 60 of the heat absorbers. Once the elongated strands 60 are folded, the resultant structure may be compressed and/or fastened to hold its structure.

In one embodiment, multiple folded heat absorber structures of the elongated strands 60 may be inside each of the tubes 40, such as stacked upon one another along a length of each of the tubes 40. Additionally, these stacked heat absorber structures may be formed of different materials, depending on their position inside the tubes 40. For example, near a heat exchange medium inlet of each of the tubes 40, the elongated strands 60 may be formed of a material having a lower temperature resistance (e.g., carbon steel, copper, or any other suitable material) than that of a material (e.g., silicon carbide, CHROMEL®, INCONEL®, or any other suitable nickel or other high-temperature alloy, a high-temperature ceramic, or any other suitable material) of the elongated strands 60 located near a heat exchange medium outlet of each of the tubes 40. CHROMEL® is a registered trademark of the Hoskins Manufacturing Company. INCONEL® is a registered trademark of Special Metals Corporation (New Hartford, N.Y.) and Huntington Alloys Corporation (Huntington, W. Va.). Further, in an embodiment of a heat receiver in which a heat transfer medium flowing through the tubes 40 is a medium other than air, the elongated strands 60 near the heat transfer medium outlet of the tubes 40 (i.e. the high-temperature end) may be formed of tungsten, carbon, titanium, or an alternative suitable material.

Figure 11B:
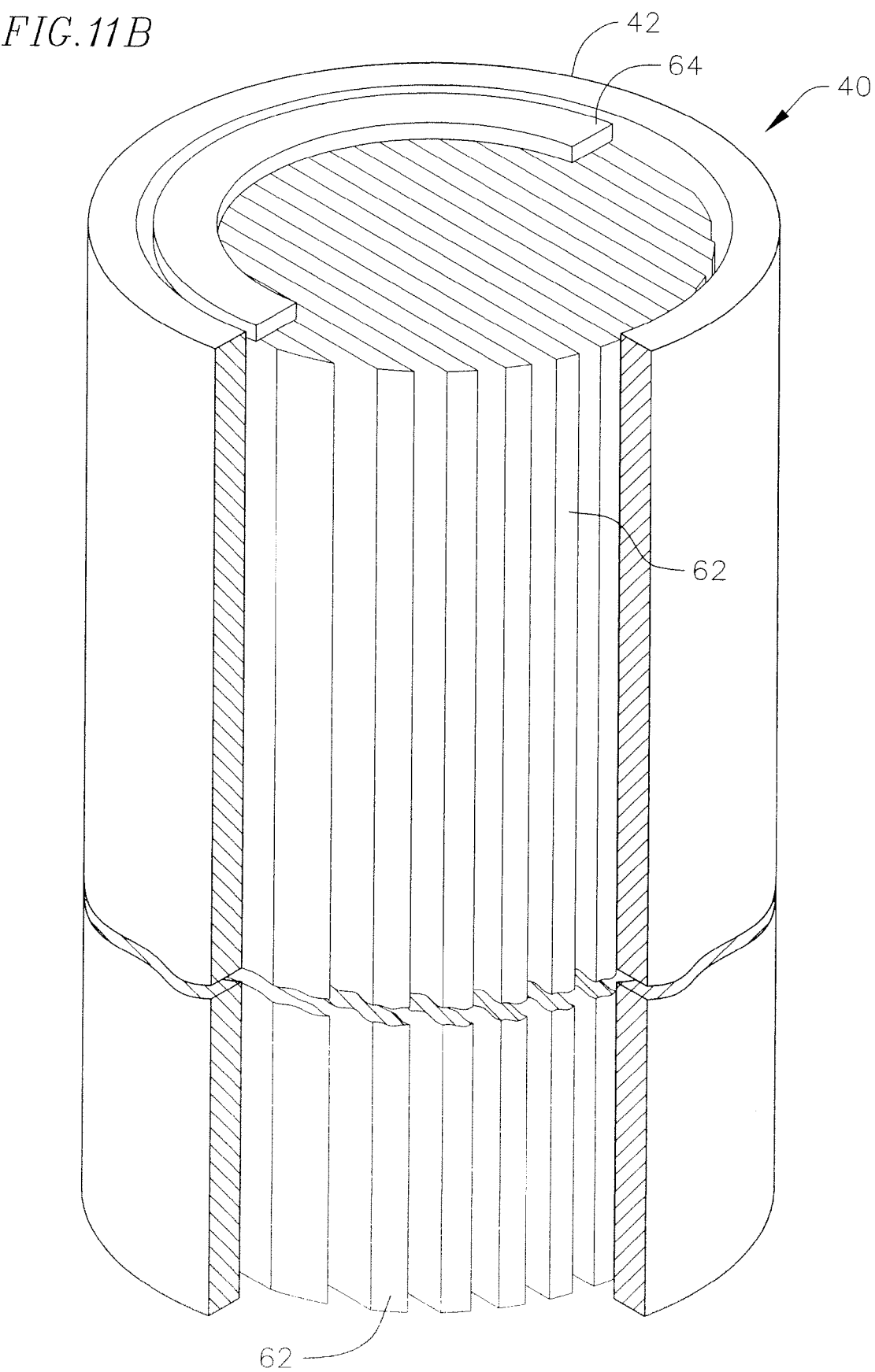
FIG. 11B is a perspective sectional view of a tube of a heat receiver according to another embodiment of the present invention.

With reference to FIGS. 10B and 11B, according to another embodiment, the tubes 40 include heat absorbers having fins 62. The fins 62, according to one embodiment, are formed of silicon carbide. In other embodiments, the fins 62 may be made of any suitable material, such as INCONEL®, or another suitable high-temperature alloy or high-temperature ceramic. The fins 62 are connected to and extend from a peripheral support 64, which, in one embodiment, extends from near the first end 46 of the tube 40 to near the second end 48 of the tube 40. The peripheral support 64 is made from any suitable material, such as INCONEL®, or another suitable high-temperature alloy or high-temperature ceramic.

Figure 11C:
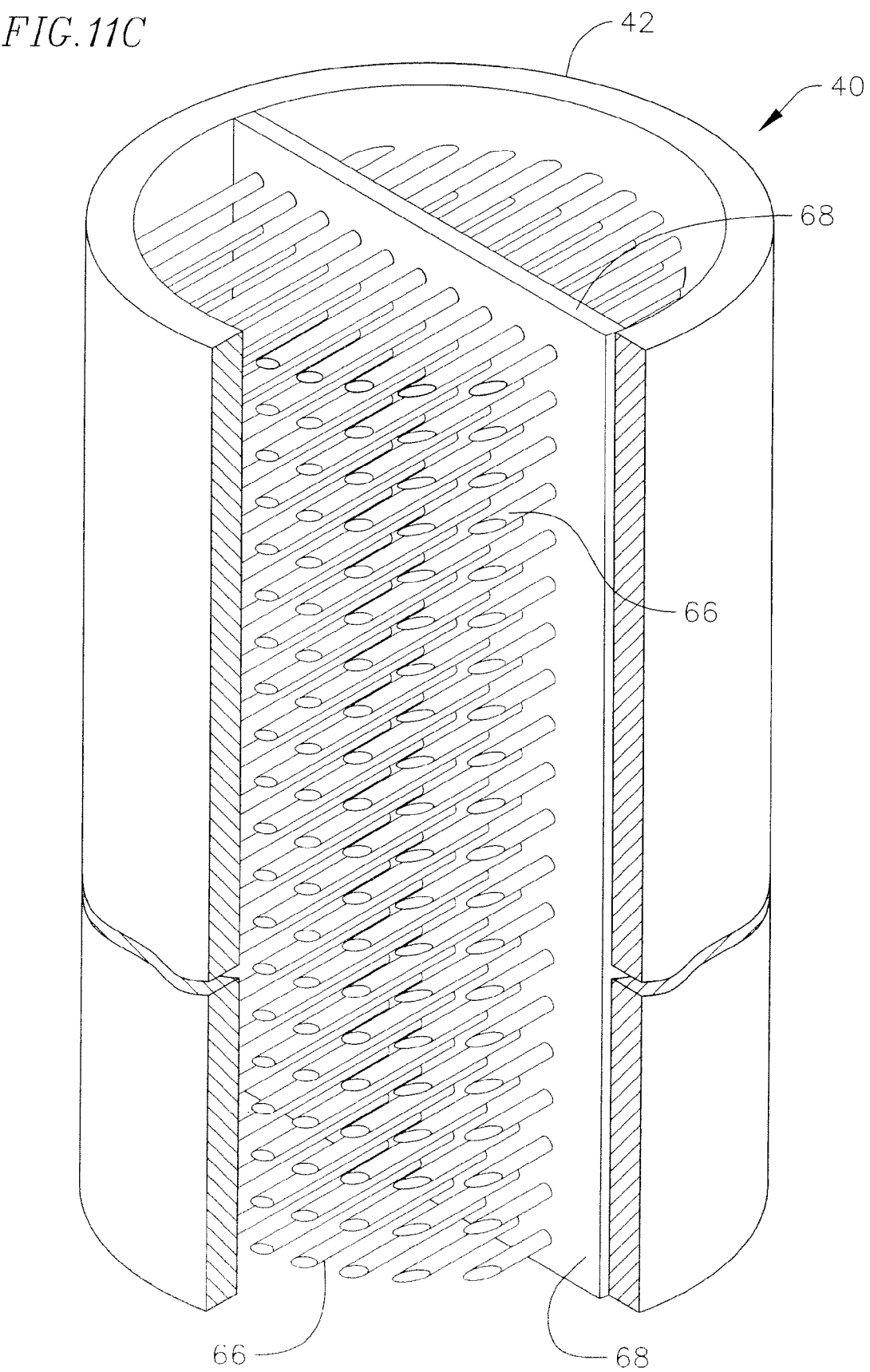
FIG. 11C is a perspective sectional view of a tube of a heat receiver according to another embodiment of the present invention.

With reference to FIGS. 10C and 11C, the tubes 40, according to another embodiment, include heat absorbers having rods 66. The rods 66 are connected to and extend from each side of a central support 68. The rods 66, according to one embodiment, are formed of silicon carbide. In other embodiments, the rods 66 may be made of any suitable material, such as INCONEL®, or another suitable high-temperature alloy or high-temperature ceramic. The central support 68 may be a plate extending from near the first end 46 of the tube 40 to near the second end 48 of the tube 40. The central support 68, in one embodiment, is connected to and extends across an inside diameter of the tube 40. The central support 68 is made from any suitable material, such as INCONEL®, or another suitable high-temperature alloy or high-temperature ceramic.

Figure 11D:
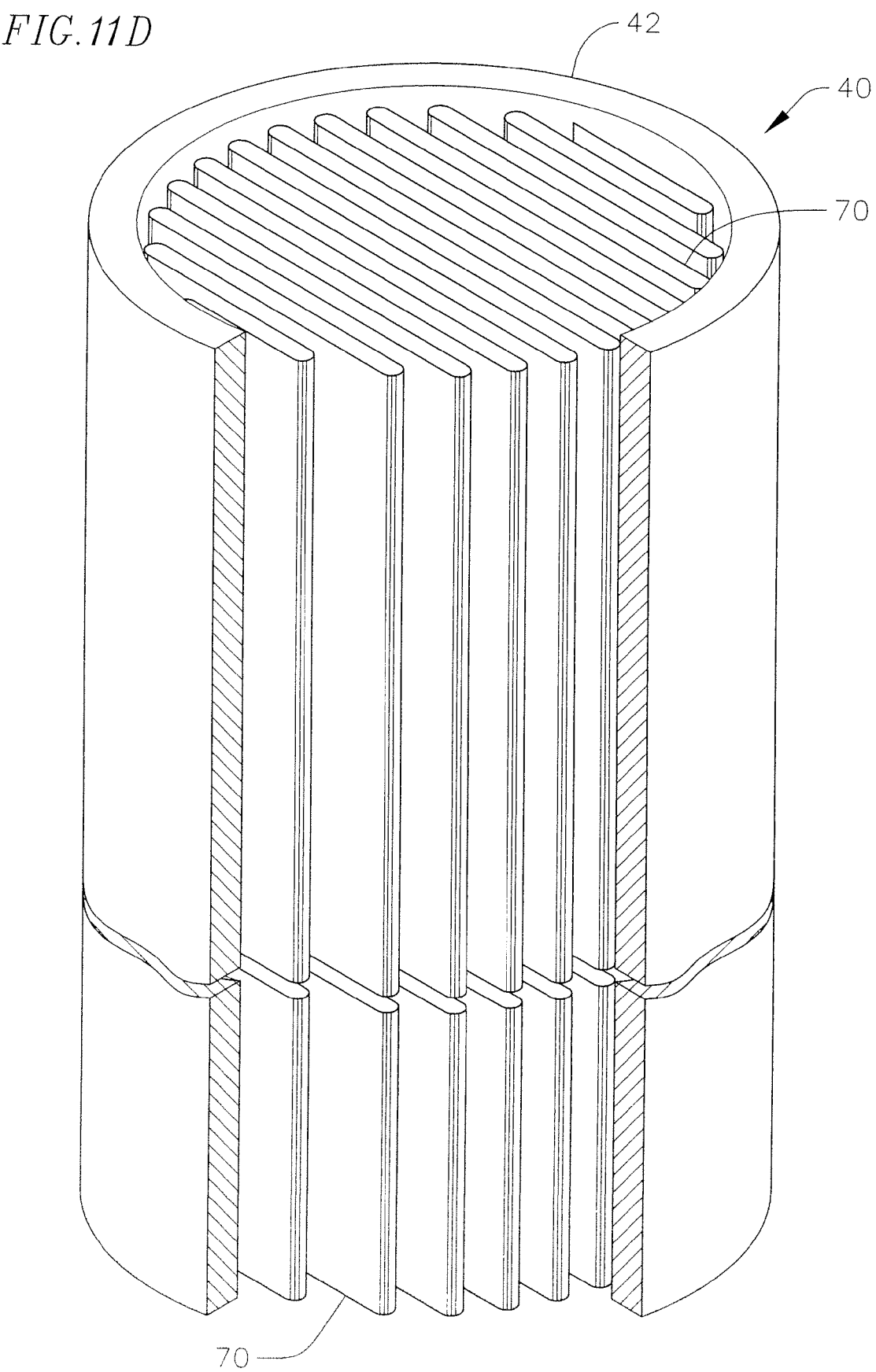
FIG. 11D is a perspective sectional view of a tube of a heat receiver according to another embodiment of the present invention.

With reference to FIGS. 10D and 11D, the tubes 40, according to another embodiment, include heat absorbers having a convoluted member 70. The convoluted member 70 has a wavy shape and may be formed of an extruded or folded piece extending from near the top of the tube 40 to near the bottom of the tube 40. The convoluted members 70, according to one embodiment, are formed of INCONEL®. In other embodiments, the convoluted members 70 may be made of any suitable material, such as silicon carbide, or any other suitable high-temperature alloy or high-temperature ceramic.

The tubes 40 may alternatively include heat absorbers having configurations other than those described above and shown in FIGS. 10A-D and FIGS. 11A-D, or combinations thereof. In other embodiments, the tubes 40 may have pins protruding from a strip of suitable material as heat absorbers. The strip of material, as well as the pins, may be formed of silicon carbide, for example.

In other embodiments, the heat absorbers may include a combination of pins, rods, and/or fins. In still other embodiments, the heat absorber may be a foam having a volume density of between about 1 percent and about 20 percent. The foam may be a high-temperature silicon foam or any other suitable heat-conducting foam. Additionally, some of the tubes 40 may include heat absorbers according to one embodiment, and other tubes 40 of the same heat receiver 20 may include heat absorbers according to a second embodiment. Further, each one of the tubes 40 may include more than one configuration of heat absorber in the same tube 40.

As will be described below, a heat receiver, according to another embodiment, may include a plurality of outer tubes and a plurality of inner tubes, one or more of the inner tubes positioned inside one of the outer tubes.

With reference to FIG. 12, the heat receiver 20 is configured to be utilized with the heat engine 12 described previously with respect to the heat receiver 10. For example, the heat engine 12 may be a gas turbine for use with the fused silica tube-based heat receiver 20. The heat receiver 20 includes a gas inlet 81 configured to receive gas at a first temperature from the heat engine 12. By way of example, the gas inlet 81 receives pressurized gas (e.g., 150 pounds per square inch) from the compressor component of the heat engine 12. The heat receiver 20 further includes a gas outlet 82 configured to provide heated gas to the heat engine 12. The heated gas exits the heat receiver 20 at the gas outlet 82 at a second temperature that is greater than the first temperature. The turbine engine includes turbines that rotate in response to the flow of heated gas therethrough.

With further reference to FIG. 12, in one embodiment, the heat receiver 20 includes regions of various relative temperatures during operation. As depicted in FIG. 12, the heat receiver 20 has been divided into four regions, or quadrants, to illustrate the varying temperatures throughout the housing 22 of the heat receiver 20. A first quadrant 85 of the housing 22 is located nearest the gas inlet 81 and the gas outlet 82 and has a relatively high temperature during operation. A second quadrant 86 of the housing 22 is adjacent the first quadrant 85. A third quadrant 87 of the housing 22 is also adjacent the first quadrant 85 and opposite the second quadrant 86. Each of the second and third quadrants 86, 87 have a high temperature during operation, but slightly cooler than the first quadrant 85. A fourth quadrant 88 of the housing 22 is adjacent each of the second and third quadrants 86, 87 and operates at a cooler temperature than the first, second, and third quadrants 85, 86, 87. The roof 26 of the heat receiver has a cooler temperature than each of the four quadrants 85, 86, 87, 88 of the housing 22 during operation of the heat receiver 20.

Figure 13A:
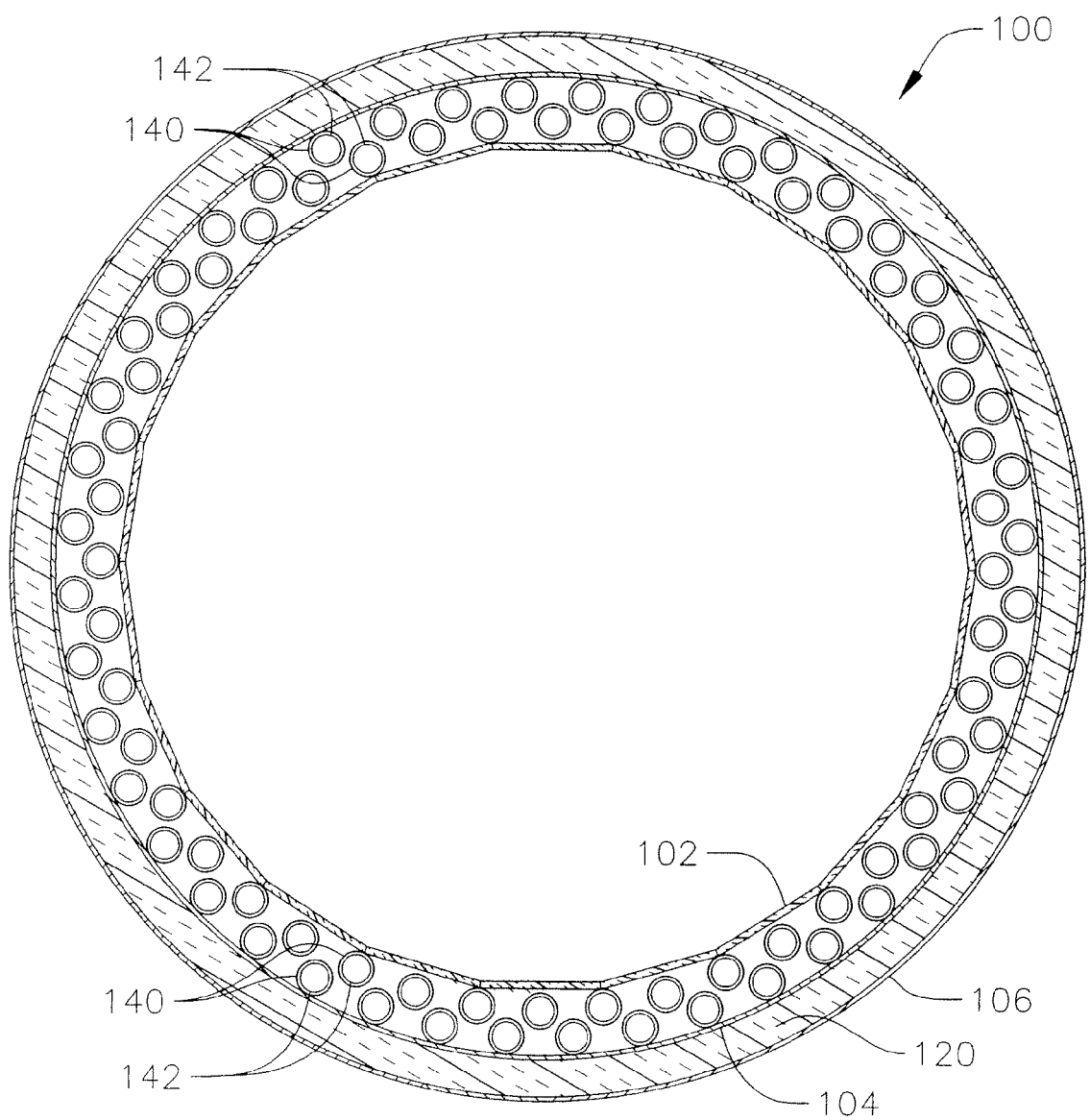
FIG. 13A is a simplified top sectional view of a heat receiver according to another embodiment of the present invention.
Figure 14:
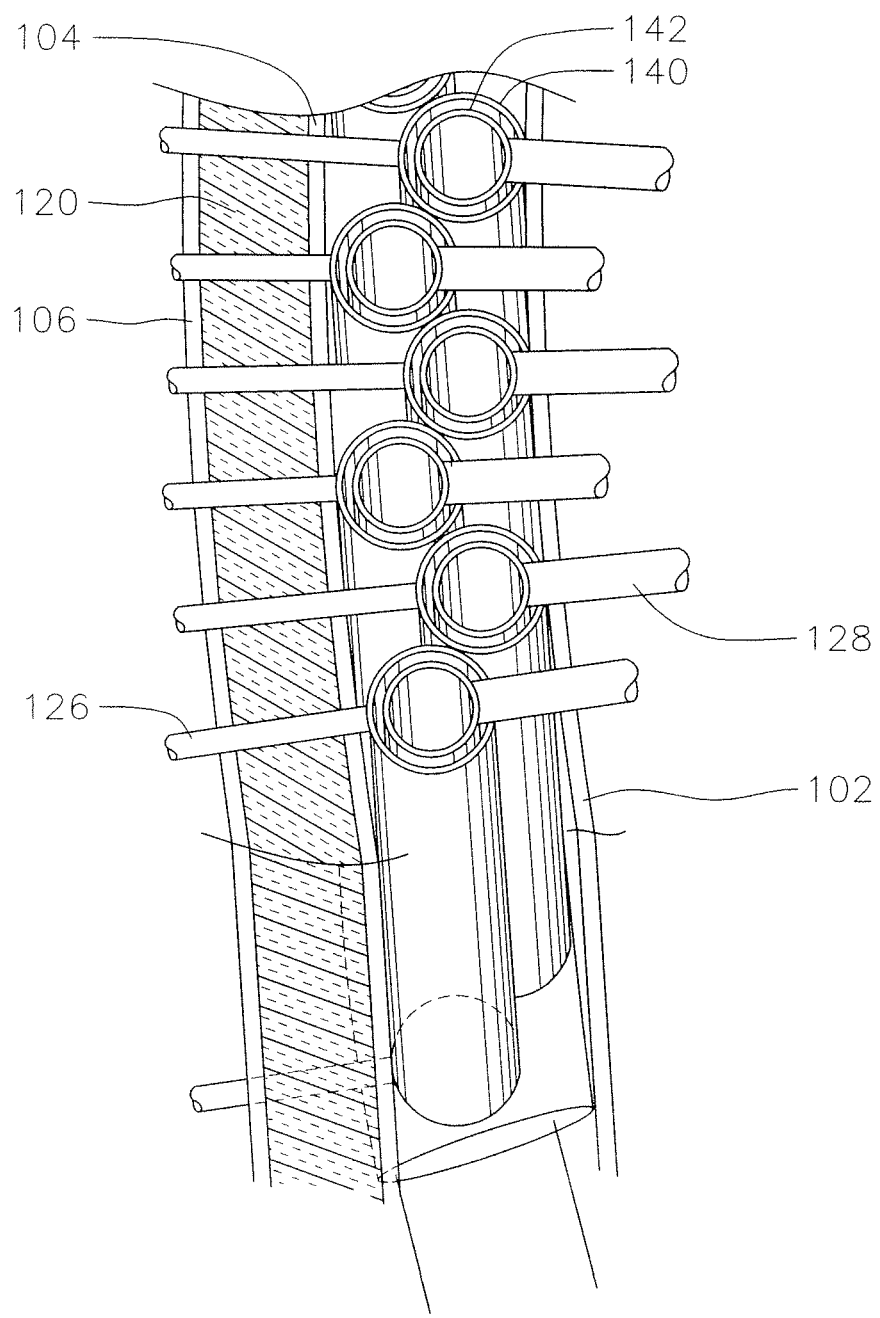
FIG. 14 is a top perspective view of a portion of the heat receiver of FIG. 13A.

With reference to FIGS. 13A and 14, a heat receiver 100 according to another embodiment, is configured to reduce stresses on the gas passages at high temperatures. The heat receiver 100, according to the present embodiment, includes a window wall 102, an inner casing wall 104, an outer casing wall 106, and insulating material 120 between the inner casing wall 104 and the outer casing wall 106. The heat receiver 100 also includes outer tubes 140 and inner tubes 142, each of the inner tubes 142 inside a corresponding one of the outer tubes 140. The heat receiver 100, according to one embodiment, also includes a roof, such as the roof 26 described above with respect to the heat receiver 20.

The window wall 102 is configured to provide a temperature barrier, as described below with reference to FIG. 15, and also to allow sunlight to pass through. As such, the window wall 102, according to one embodiment, is formed of fused silica or fused quartz. In another embodiment, the window wall 102 is formed of high-temperature glass. Alternatively, the window wall 102 may be formed of any other suitable transparent material. As shown in FIG. 13A, the window wall 102 may be formed of a plurality of flat panes. Alternatively, the window wall 102 may be formed of curved panels or a unitary member. The flat panes of the window wall 102, in one embodiment, may be joined utilizing a sealing material, such that gas or air may not pass between the flat panes. Alternatively, there may be gaps between the flat panes of the window wall 102.

The inner casing wall 104 and the outer casing wall 106 are configured to protect and house the outer and inner tubes 140, 142 and seal from the environment, retain the insulating material 120, and also retain solar thermal heat within the heat receiver 100. As such, the inner casing wall 104, according to one embodiment, is formed of stainless steel. Alternatively, the inner casing wall 104 may be formed of aluminum, a high-temperature alloy or ceramic, or another suitable material. The outer casing wall 106, according to one embodiment, is formed of sheet metal, such as carbon steel or aluminum. Alternatively, the outer casing wall 106 may be formed of another material suitable to seal against the environment. Further, the outer casing wall 106 may be painted or otherwise treated, as described above with respect to the outer wall 24 of the heat receiver 20.

Figure 16:
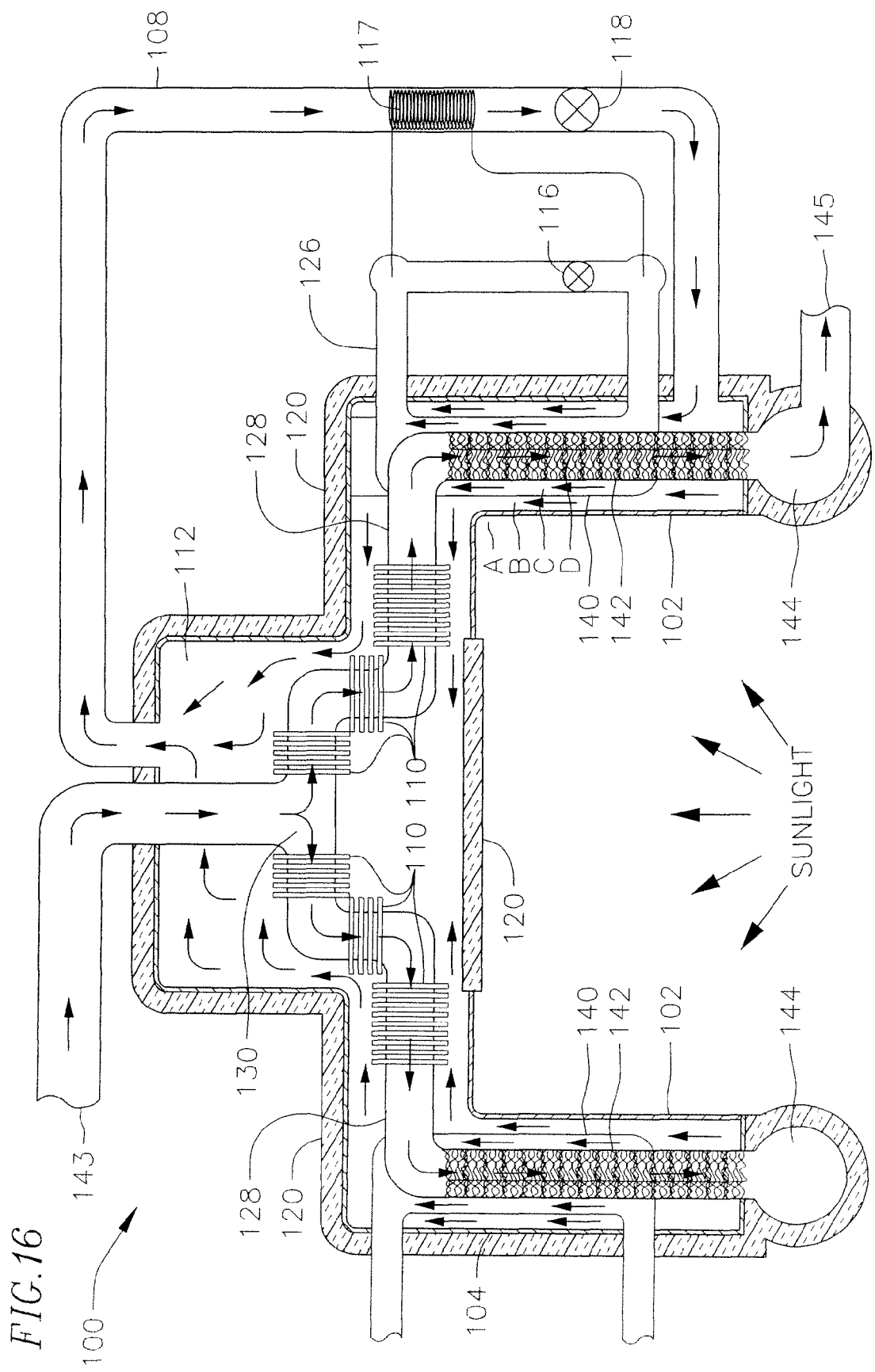
FIG. 16 is a simplified cross-sectional diagram showing the flow of gas and heat exchange taking place in a heat receiver having a dual-tube configuration according to an embodiment of the present invention.
Figure 17:
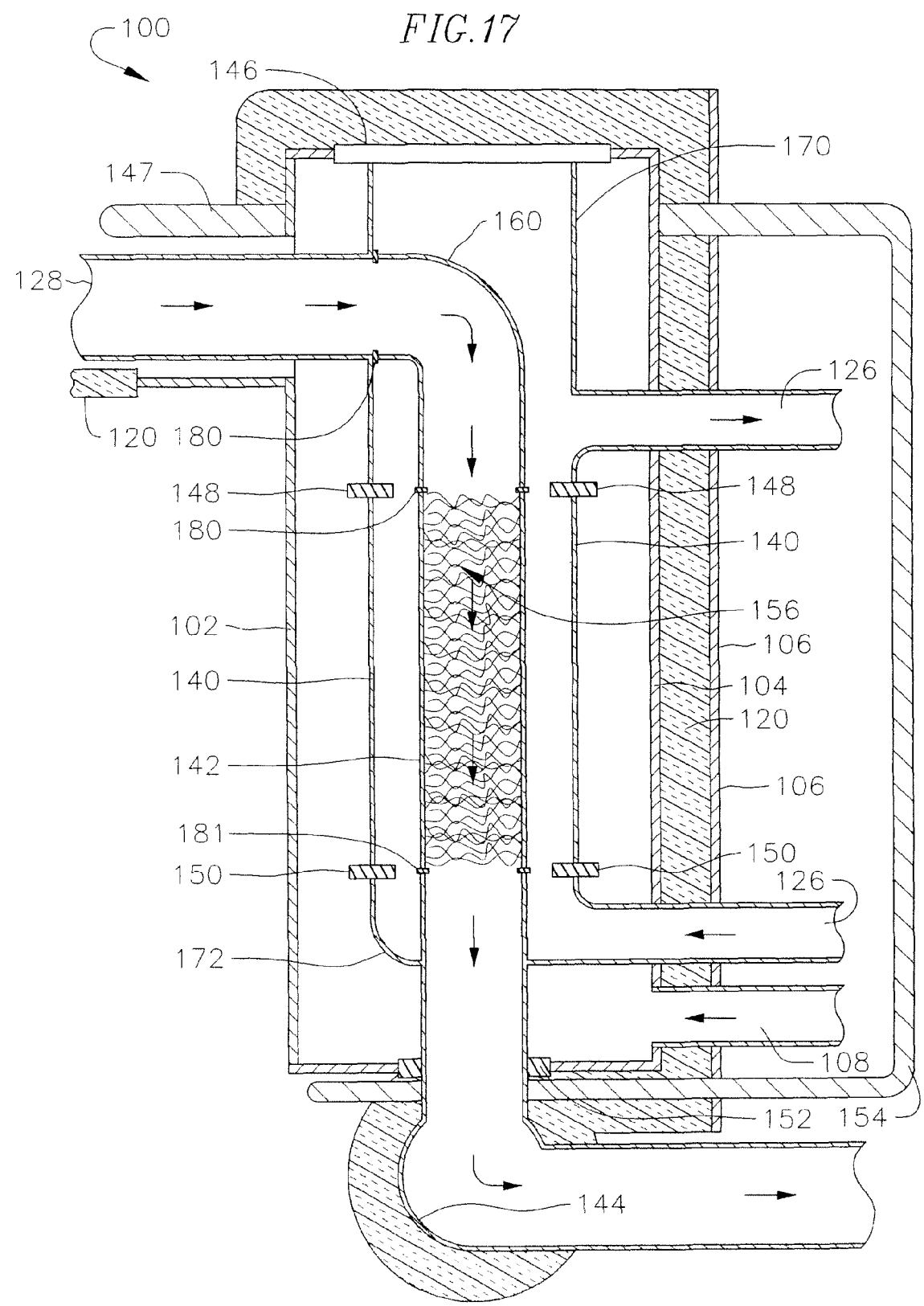
FIG. 17 is a simplified cross-sectional diagram showing a dual-tube configuration of a heat receiver according to an embodiment of the present invention.

The insulating material 120 is configured to prevent or deter thermal energy from exiting the heat receiver 100 through the outer casing wall 106. That is the insulating material 120 is located on the non-illuminated side of the inner and outer tubes 140, 142. Alternatively, the insulating material 120 may be adjacent an outer surface of the outer casing wall 106, or adjacent both the inner surface and the outer surface of the outer casing wall 106. The insulating material 120, in one embodiment, includes refractory insulating material. Alternatively, the insulating material 120 may include any other suitable material, such as FIBER BLOCK, PYROBLOCK, or PERLITE. Further, the insulating material 120 may be in additional or alternative locations, as depicted in FIGS. 16 and 17.

With further reference to FIGS. 13A and 14, a plurality of the outer tubes 140 may be arranged along an inner periphery of the inner casing wall 104, in substantially the same manner as the tubes 40 of the heat receiver 20, between the inner casing wall 104 and the window wall 102. The outer tubes 140 may be made of fused silica and may have substantially the same configuration as the tubes 40 of the heat receiver 20, as described above. Also, the outer tubes may have a gas outlet to an intertube gas passage 126, described in further detail below. As shown in FIG. 13A, in one embodiment, the outer tubes 140 may be arranged in two layers (or rows) to collect sunlight. Alternatively, the outer tubes 140 may be arranged in configurations similar to those of the tubes 40, as described above and shown in FIGS. 8A-D. In one embodiment, an inner tube 142 is located inside each of the outer tubes 140. Each of the inner tubes 142 may be made of substantially the same material (e.g., fused silica) as that of the outer tubes 140.

According to another embodiment, both the outer tubes 140 and the inner tubes 142 are transparent, but the outer tubes 140 are formed of a different material than the corresponding inner tubes 142. According to one embodiment, the inner tubes 142 are formed of a material having high temperature resistance, such as fused silica, fused quartz, or any other suitable material, as described above with respect to the tubes 40. The outer tubes 140 may be formed of a material having a lower temperature resistance (and likely a lower cost), such as borosilicate glass or another suitable material, due to a temperature gradient (discussed in more detail below) across the walls of the inner tubes 142. That is, in one embodiment, each of the inner tubes 142 has a maximum allowable tube temperature (i.e. the maximum temperature of the tube material at which structural integrity of the material is maintained for a selected pressure and tube geometry) that is greater than a maximum allowable tube temperature of a corresponding outer tube 140. Further, in the described embodiment, the different transparent materials of the outer tubes 140 and the inner tubes 142 may have different spectral absorption characteristics. As such, efficiency of radiant energy collection may be improved because light emitted through the inner tubes 142 may be absorbed by the outer tubes 140.

In one embodiment, the inner tubes 142 house a heat absorber (such as one of the heat absorbers described above with respect to FIGS. 10A-11D) and provide a flow path for a heat exchange medium, such as air. Further, the space within each of the outer tubes 140 but outside the wall of the corresponding inner tube or tubes 142 may provide another flow path for a heat exchange medium that functions to recover heat passing through the wall of the inner tube 142, as well as part of the radiation absorbed in the outer tube 140. As also described in further detail below, the flow paths of the inner and outer tubes 140, 142 may be connected such that a common heat exchange medium passes through the flow paths of each of the inner and outer tubes 140, 142 (see, e.g., FIG. 19), or the flow paths may be separate with a first heat exchange medium passing through the inner tube 142 and a second heat exchange medium passing through the outer tube 140 and recovering heat via a heat exchanger (see, e.g., FIG. 16). In another embodiment, a heat receiver may be configured such that some tubes have connected flow paths, and other tubes have separate flow paths for use with a heat exchanger.

According to one embodiment, each of the inner tubes 142 has substantially the same shape as that of a corresponding outer tube 140, except that the diameter of the inner tube 142 is smaller than that of the outer tube 140. The inner tube 142 and the outer tube 140 may have concentric circular cross-sections, for example. Also, in one embodiment, a wall thickness of the inner tube 142 may be different than a wall thickness of the outer tube 140. Each of the inner tubes 142, in the present embodiment, has a gas inlet from a "spoke" passage 128, described in further detail below.

Further, in other embodiments, a heat receiver according to the present invention may include more than one inner, or internal, tube inside an outer, or external, tube, such as in a configuration wherein each of the internal tubes is substantially concentric to the corresponding outer tube (e.g., a "triple tube"), or alternatively, in a configuration wherein multiple internal tubes that are not within or concentric to one another are inside a corresponding external tube.

Figure 13B:
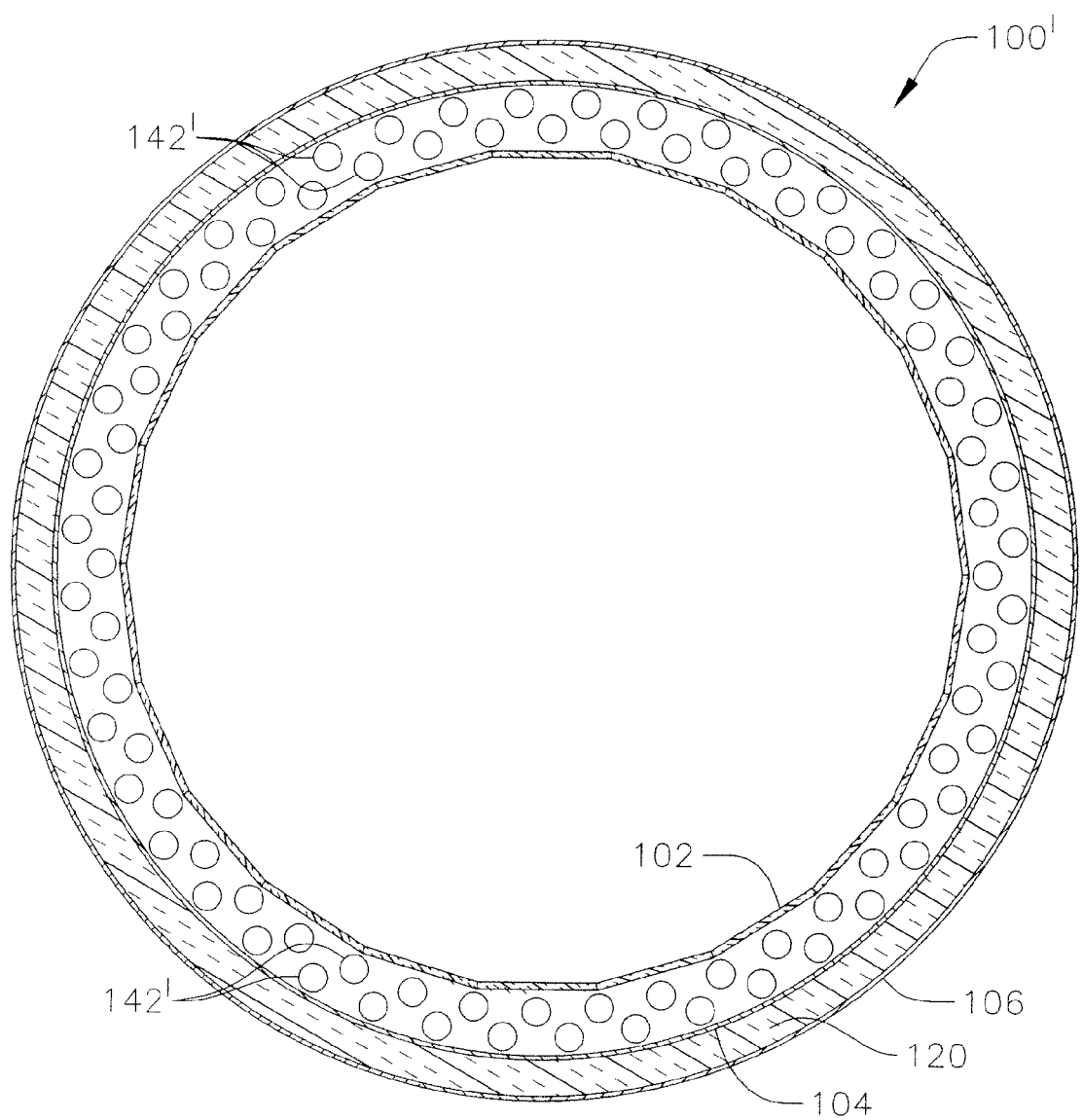
FIG. 13B is a simplified top sectional view of a heat receiver according to another embodiment of the present invention.

With reference to FIG. 13B, in another embodiment, a heat receiver 100' is substantially similar to the heat receiver 100 shown in FIGS. 13A and 14 and described above, except that the heat receiver 100' includes a pattern of single tubes 142' rather than the "double tubes" of the heat receiver 100. That is, the heat receiver 100' includes a pattern of tubes 142' substantially similar to the inner tubes 142 of the heat receiver 100, but does not include the outer tubes 140 (as described above with respect to the heat receiver 100). Further, similar to the inner tubes 142 of the heat receiver 100, according to one embodiment, the tubes 142' of the heat receiver 100' also have one or more heat absorbers located therein. In a low-pressure system including the heat receiver 100', such as for exchanging heat with a steam turbine, two flow paths, either connected to one another or separate, for recovery of heat may be provided, wherein a first flow path is provided through the tubes 142', and a second flow path is provided through the space between the tubes 142' and the window wall 102.

Figure 15:
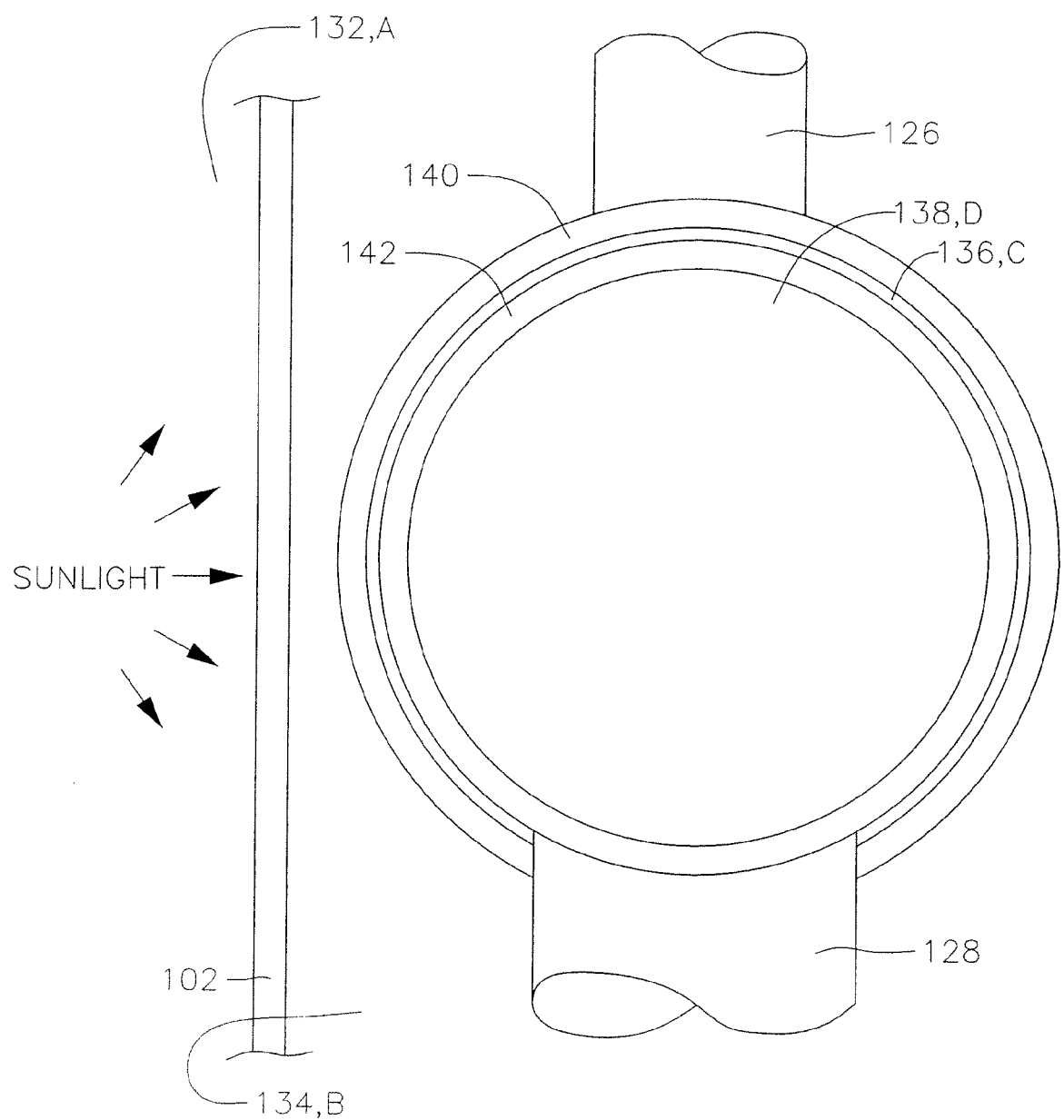
FIG. 15 is a detail top view of a portion of the heat receiver of FIG. 13A.

FIG. 15 shows one of the inner tubes 142 within one of the outer tubes 140, as well as a portion of the window wall 102. FIG. 15 illustrates regions of various temperatures and pressures within the heat receiver 100 during operation, according to one embodiment. In an exterior region 132 (region "A") outside the window wall 102, a substantially ambient condition exists, having a relatively low temperature (e.g., between about 50 degrees Celsius and about 150 degrees Celsius) and a relatively low pressure (e.g., about 1 atmosphere). Of course, the temperature and pressure of region "A" may vary depending on ambient conditions and/or heat retained in region "A" by the heat receiver 100.

In an interwall region 134 (region "B") between the window wall 102 and the inner casing wall 104 (shown in FIGS. 13A and 14), but outside of the outer tube 140, another recirculated heat exchanging gas has a medium temperature (e.g., about 400 degrees Celsius) and a low pressure (e.g., about 1 atmosphere). Here, the window wall 102 is configured to bear the stress associated with the temperature differential, but there is no substantial pressure differential.

In an intertube region 136 (region "C") between the wall of the outer tube 140 and the wall of the inner tube 142, a recirculated heat exchanging gas has a medium temperature (e.g., about 450 degrees Celsius) and a relatively high pressure (e.g., between about 40 and about 350 pounds per square inch). Here, there is a relatively high pressure difference between the wall of the outer tube 140 and the wall of the inner tube 142. However, there is not a substantial temperature difference. As such, the outer tube 140 is configured to bear the stress associated with the pressure differential.

In an inner tube region 138 (region "D") inside the inner tube 142, a gas to be sent to the heat engine 12 has a relatively high temperature (e.g., between about 400 degrees Celsius entering region "D" and about 850 degrees Celsius or greater exiting region "D") and a relatively high pressure (e.g., about 150 pounds per square inch). Here, the inner tube 142 is configured to bear the stress associated with the relatively great temperature differential.

The temperatures and pressures, according to other embodiments, may vary from the values described above without departing from the spirit and scope of the present invention. The tube-in-tube configuration described above including the inner tube 142 within the outer tube 140 is configured to reduce temperature or pressure primarily at different locations across the inner and outer tubes 140, 142 and the window wall 102, thereby reducing stresses on any single element. In other words, only one of temperature and pressure is substantially changed across any single barrier.

FIG. 16 is a simplified cross-sectional diagram that shows the flow of gas and heat exchange taking place in the heat receiver 100, the heat receiver 100 having a fused silica dual-tube configuration, as described above. As FIG. 16 is a simplified cross-sectional diagram, some of the elements that are not essential to the complete description of the invention have been omitted for the convenience of description.

In one embodiment, the inner tube 142 at one end (e.g., a bottom end) is connected to a plenum 144 for communicating gas between the inner tube 142 and a heat engine (e.g., gas turbine). The plenum 144 may be formed of silicon carbide, INCONEL®, or an alternative suitable material. The inner tube 142 at the other end (e.g., a top end), according to the present embodiment, is coupled to one of a plurality of "spoke" passages 128 for communicating gas recirculated from the heat engine to the inner tube 142. The plurality of "spoke" passages 128 are connected to and branch from a hub 130 and are configured to carry gas to the respective coupled inner tubes 142 located at the periphery of the heat receiver 100. The "spoke" passages 128 may be tubes or pipes formed of stainless steel, or another suitable material.

In the present embodiment, the heat receiver 100 includes one or more heat exchangers 110 for exchanging heat between a relatively warm preheat gas and a relatively cool compressed gas from the heat engine. The heat exchangers 110 may include plates or fins configured to conduct heat, for example, or may be any other suitable heat exchanger known in the art.

A heat exchange gas passage 108 is shown in FIG. 16. The heat exchange gas moves outside the outer tubes 140, but within the window wall 102, shown as region "B." According to the present embodiment, the heat exchange gas flows in a direction opposite the gas flow in the inner tubes 142. Alternatively, the heat exchange gas may travel in a direction of the gas in the inner tubes 142. The heat exchange gas passes through the heat exchange cavity 112 and through or past at least one of the heat exchangers 110, and is then recirculated to region "B" near the bottom end of the inner and outer tubes 140, 142 through the heat exchange gas passage 108. In the present embodiment, the heat exchange gas passage 108 is external to a housing of the heat receiver 100 and includes a pump 118 for moving heated gas through the heat exchange gas passage 108, region "B," and the heat exchange cavity 112. Alternatively, other embodiments may not include the pump 118.

An intertube heat exchange gas passage 126 is also shown in FIG. 16. The intertube heat exchange gas moves through the outer tubes 140, but outside the inner tubes 142, depicted as region "C." According to one embodiment, as depicted in FIG. 16, the intertube heat exchange gas flows through the outer tubes 140 in a direction opposite the gas flow in the inner tubes 142. However, in other embodiments, the directions of any or all of the gas flows depicted in FIG. 16 may be reversed. The intertube heat exchange gas exits the outer tubes 140, passes through the intertube heat exchange gas passage 126, and is then recirculated to the bottom end of the outer tubes 140. In the present embodiment, the intertube heat exchange gas passage 126 is external to a housing of the heat receiver 100 and includes a pump 116 for circulating the intertube heat exchange gas. Alternatively, other embodiments may not include the pump 116. Also, as shown in FIG. 16, the heat exchange gas passage 108 and the intertube heat exchange gas passage 126 may be connected and exchanging heat through a suitable heat exchanger 117.

The following is a description of the gas flow and heat exchange process in the heat receiver 100 of FIG. 16 according to one exemplary embodiment. The compressed gas (e.g., from the heat engine) enters the heat receiver 100 through a gas inlet 143 near the top portion of the heat exchange cavity 112 and moves into the hub 130. However, the compressed gas in the hub 130 is not mixed with the heat exchange gas in the heat exchange cavity 112. The compressed gas moves from the hub 130 into the plurality of "spoke" passages 128 that branch from the hub 130 and transport the compressed gas from near the center of the heat receiver 100 to the inner tubes 142 located at or near the periphery of the heat receiver 100. In other embodiments, passages for the compressed gas other than the "spoke" passages 128 may be provided as those skilled in the art would appreciate.

While traveling downstream from the gas inlet 143 near the top of the heat receiver 100, through the hub 130, into the "spoke" gas passages 128, and through the inner tubes 142 (depicted in FIG. 16 as region "D"), the gas is heated by sunlight entering through the window wall 102 from region "A." The heated gas exits the heat receiver 100 through a gas outlet 145 of the plenum 144 to which the bottom ends of the inner tubes 142 are connected. The heated gas travels from the gas outlet 145 to the heat engine 12 for generation of electricity. Alternatively, the heated gas may be heated air that is utilized for exchanging heat with steam for use in a steam turbine.

With further reference to FIG. 16, for efficient heating of the gas between the gas inlet 143 at the top and the gas outlet 145 at the bottom of the heat receiver 100, in addition to solely relying on the sunlight to heat gas, the gas is pre-heated through the heat exchange process with a gas that flows in another direction in the heat receiver 100. In other words, the gas flows upward between the inner casing wall 104 and the window wall 102 (i.e., region "B") to the heat exchange cavity 112. In the heat exchange cavity 112, heat exchange takes place between the relatively warm heat exchange gas and the relatively cool gas that will enter the inner tubes 142 using the heat exchangers 110. By utilizing such a configuration, the gas is preheated prior to entering the inner tubes 142, thereby realizing a more efficient harnessing of solar thermal energy.

FIG. 17 is a simplified cross-sectional diagram that shows a dual-tube fused silica tube configuration in an embodiment according to the present invention. As described above in reference to FIG. 16, the inner tube 142 is located inside the outer tube 140. A cap 146 (e.g., a threaded cap) closes an opening of the outer tube 140 at the top. An upper structural support 147 may be located to provide alignment of the top ends of the outer tubes 140 and/or the "spoke" gas passages 128 for receiving compressed gas from the heat engine.

The inner tubes 142 may each include at least one heat absorber 156 for absorbing and/or spreading heat to further enhance the efficiency of solar thermal energy harnessing. The heat absorber 156 may have any suitable form (e.g., "spaghetti," fins, pins, elongated strands, or coiling) or combination thereof, such as described above with respect to the heat receiver 20, and may be made of any suitable material (e.g., silicon carbide or high-temperature alloys), such as described herein.

In one embodiment, the inner tube 142 is located in the outer tube 140 and connected in such a manner that it may be removed or replaced relatively easily. Removal or replacement of the inner and outer tubes 142, 140 may be desired for repair or refurbishment. In view of the desirability of such removal and replacement, in the present embodiment, each of the inner tubes 142 is placed on a flange 152 and coupled to the "spoke" gas passage 128 via a removable coupler passage 160. After removing the cap 146, or other similar device providing access, (e.g., by unthreading), the inner tube 142 may be removed and/or replaced by disconnecting the coupler passage 160 from the inner tube 142.

The outer tubes 140 are coupled at the top end and bottom end to a top end piece 170 and a bottom end piece 172, respectively. The pressure seals 148 and 150, respectively, seal the joints between the outer tubes 140 and the top and bottom end pieces 170, 172, while providing for the outer tubes 140 to be removable and/or replaceable. The top end piece 170 has a heat exchange gas outlet for providing heat exchange gas to the intertube heat exchange gas passage 126. The bottom end piece 172 has a heat exchange gas inlet for receiving heat exchange gas from the intertube heat exchange gas passage 126.

Similarly, the inner tubes 142 are coupled at the top end and bottom end to the coupler passages 160 and the bottom end piece 172, respectively. The inner tubes 142 are also connected to the plenum 144. The coupler seals 180 and 182, respectively, seal the joints between the inner tubes 142 and the coupler passages 160 and the bottom end piece 172, while providing for the inner tubes 142 to be removable and/or replaceable. The coupler passage 160 has a compressed gas inlet for providing compressed gas from one of the "spoke" passages 128. The plenum 144 has a compressed gas outlet for sending heated compressed gas to the heat engine 12, for example.

A lower structural support 154 is connected to the upper structural support 147 and located to provide structural support to the bottom of the inner tube 142. The upper and lower structural supports 147, 154 are configured to expand and contract as the outer and inner tubes 140, 142 and the window wall 102 expand and contract to reduce stress. Further, the upper and lower structural supports 147, 154 are configured to allow the outer and inner tubes 140, 142 and the window wall 102 to slide relative to the upper and lower structural supports 147, 154 due to thermal expansion and/or contraction.

Figure 18:
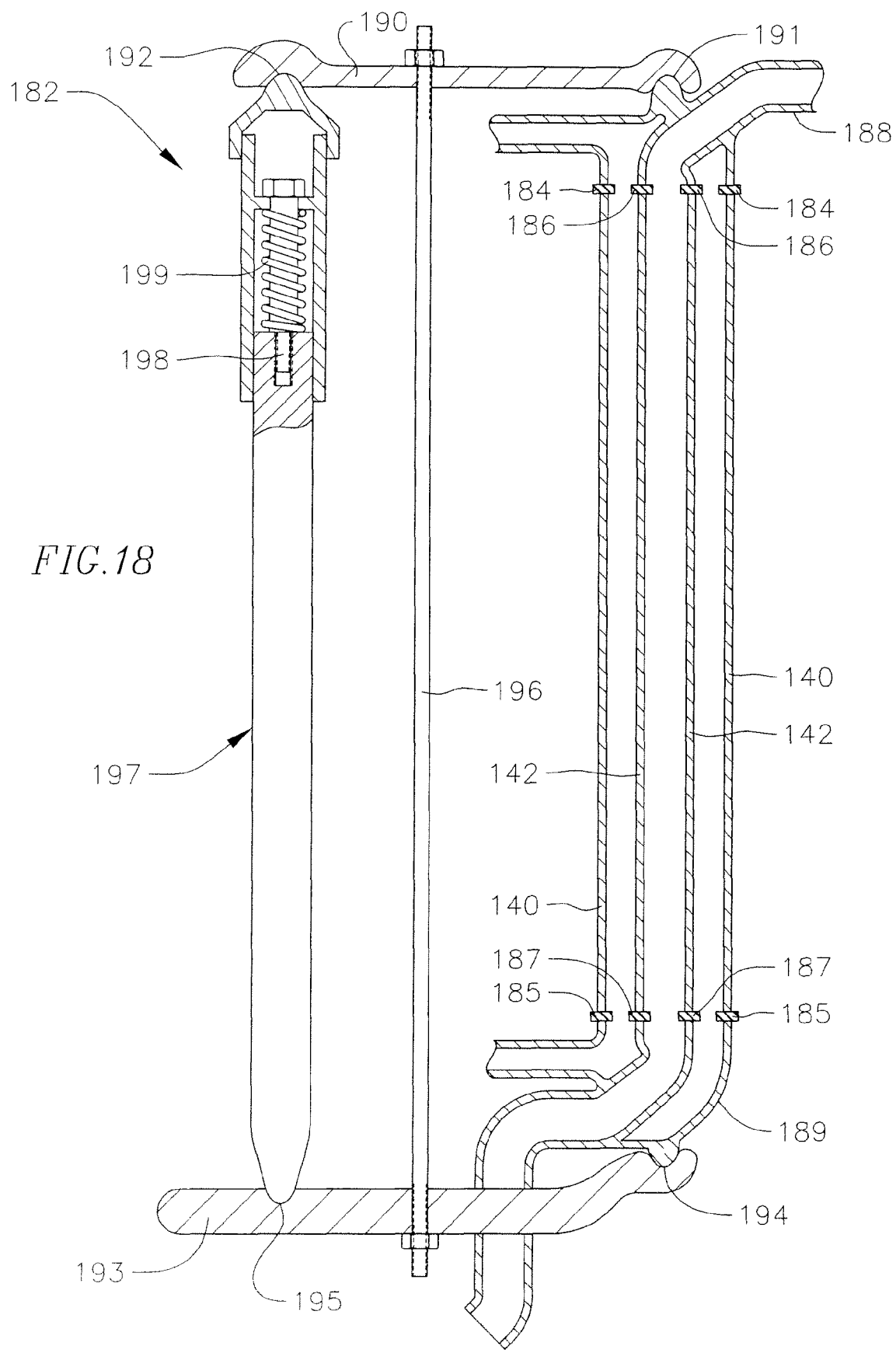
FIG. 18 is a simplified cross-sectional diagram showing a dual-tube configuration of a heat receiver according to an embodiment of the present invention.

With reference to FIG. 18, a seal pressure device 182 of the heat receiver 100 is configured to maintain sealing pressure at the top and bottom ends of the outer and inner tubes 140, 142. According to one embodiment, the seal pressure device 182 maintains sealing pressure at one or more upper seals 184 sealing a joint between the outer tubes 140 and a top end piece 188; at one or more lower seals 185 sealing a joint between the outer tubes 140 and a bottom end piece 189; at one or more upper seals 186 sealing a joint between the inner tubes 142 and the top end piece 188; and also at one or more lower seals 187 sealing a joint between the inner tubes 142 and the bottom end piece 189. The upper seals 184, 186 and the lower seals 185, 187, according to the present embodiment, are graphite seals. Alternatively, the upper seals 184, 186 and the lower seals 185, 187 may be formed of any other suitable material. In the present embodiment, the top end piece 188 is captured by an upper support plate 190 at a recess 191 of the upper support plate 190. Similarly, the bottom end piece 189 is captured by a lower support plate 193 opposite the upper support plate 190 at a recess 194 of the lower support plate 193. The upper and lower support plates 190, 193 are connected to each other by a tension rod 196, which is held in position by threaded fasteners or other suitable devices.

With further reference to FIG. 18, according to the present embodiment, the seal pressure device 182 also includes a fulcrum assembly 197. The upper support plate 190 includes a recess 192 configured to receive a ball portion of a top end of the fulcrum assembly 197. The fulcrum assembly 197 is also supported by the lower support plate 193 at a recess 195 of the lower support plate 193. The recess 192 of the upper support plate 190 and the ball portion of the fulcrum assembly 197 interact to form a fulcrum. The fulcrum assembly 197, in one embodiment, includes a shoulder bolt 198 and a compression spring 199 around a shaft of the shoulder bolt 198. The fulcrum assembly 197 and the compression spring 199 are maintained in a compressed state, in the present embodiment, by a compression pressure provided by the fasteners of the tension rod 196. The compression spring 190 is partially compressed, thereby producing an upward force at the recess 192 of the upper support plate 190, and as a result, creating a downward force on the top end piece 188 where the top end piece 188 is supported by the upper support plate 190. This downward force presses on the upper seals 184, 186 and the lower seals 185, 187. Moreover, as the outer and inner tubes 140, 142 expand at elevated temperatures, the pre-compressed condition of the fulcrum assembly 197 maintains adequate pressure on the upper seals 184, 186 and the lower seals 185, 187.

Figure 19:
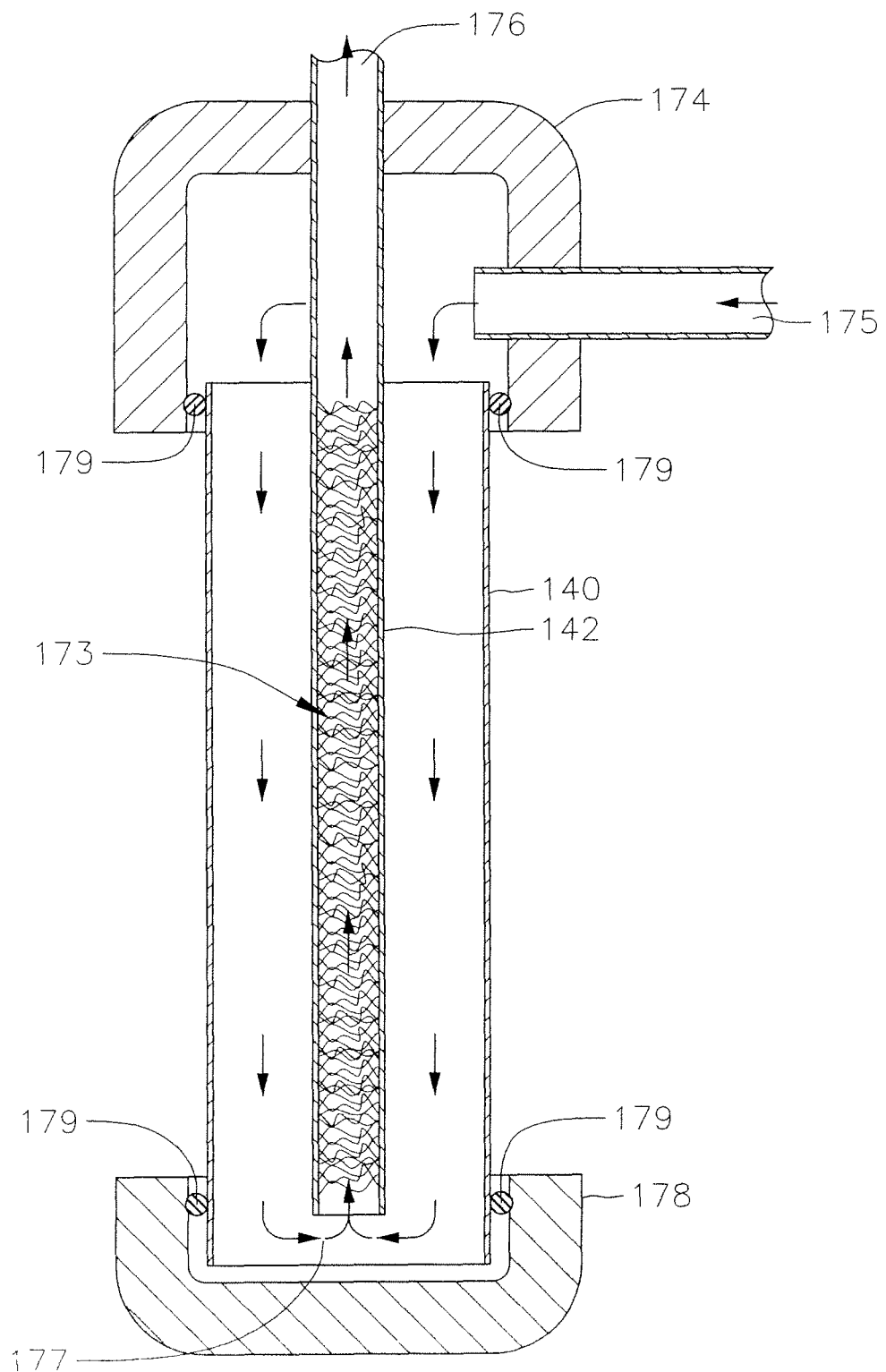
FIG. 19 is a simplified cross-sectional diagram showing another dual-tube configuration of a heat receiver according to an embodiment of the present invention.
Figure 20:
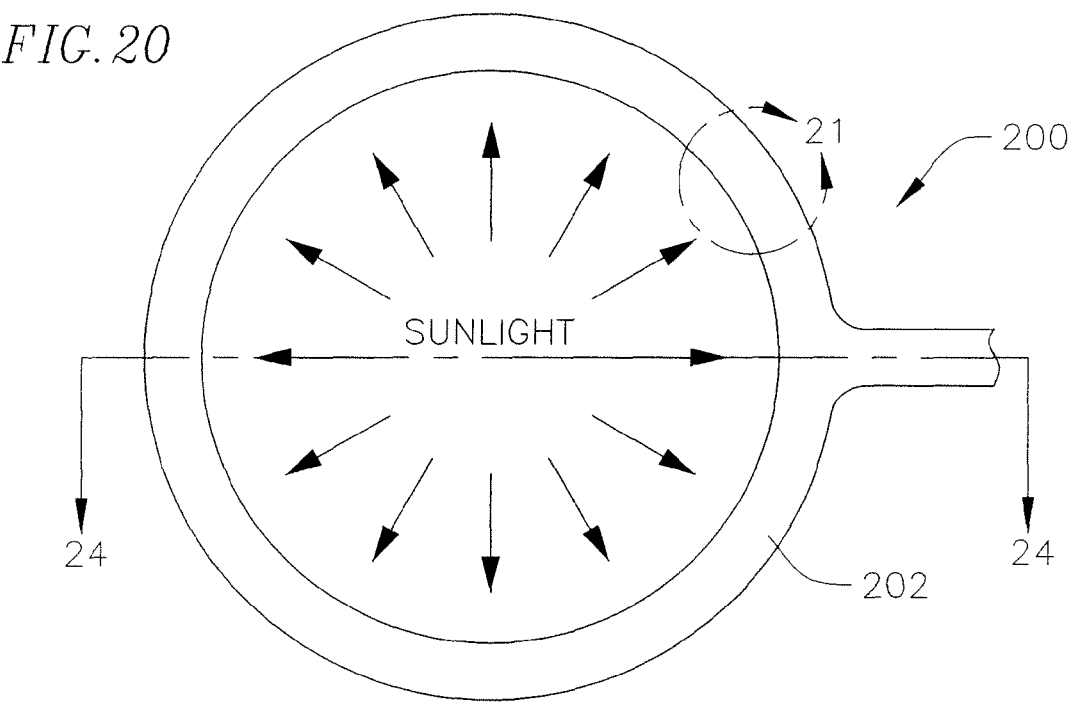
FIG. 20 is a top view of a heat receiver according to another embodiment of the present invention.

With reference to FIG. 19, according to one embodiment, a heat receiver includes a connected flow path between the inner tube 142 and the outer tube 140. That is, a flow path is provided wherein a flow of a heat transfer medium passes through one of the inner and outer tubes 140, 142, and subsequently passes through the other of the inner and outer tubes 140, 142. These two passes, one through each of the inner and outer tubes 140, 142, may be in a same direction or in opposite directions. In one embodiment, as shown in FIG. 19, a flow of a heat transfer medium enters the outer tube 140 through an inlet 175 passes through the outer tube 140 in a first direction (e.g., a downward direction) and subsequently passes through the inner tube 142 in a second direction that is opposite the first direction (e.g., an upward direction) before exiting the inner tube 142 through an outlet 176, the flow paths through the inner and outer tubes 140, 142 being connected at a region 177. Alternatively, a flow of the heat transfer medium may pass through the inner tube 142 in a same direction as it passes through the outer tube 140. Similar to the embodiment shown and described above with respect to FIG. 17, the inner tubes 142 may each include at least one heat absorber 173 for absorbing and/or spreading heat to further enhance the efficiency of solar thermal energy harnessing. The heat absorber 173 may have any suitable form (e.g., "spaghetti," fins, pins, elongated strands, or coiling) or combination thereof, such as described above, and may be made of any suitable material (e.g., silicon carbide or high-temperature alloys), such as described herein. With further reference to FIG. 19, in one embodiment, the flow paths through the inner and outer tubes 140, 142 may be contained via upper and lower header caps 174, 178 and seals 179. The heat transfer medium may exit the outlet 176 to a heat engine, such as a gas turbine or a steam turbine.

Further, in other embodiments according to the present invention, a heat receiver may include both combined flow through some of the tubes, and separate flow through some of the tubes and additionally achieve heat transfer via heat exchangers. Further, a heat receiver according to other embodiments may include a third tube or a plenum outside the double tubes, such that three regions of flow are provided, with a connected flow configuration between a pair of the three regions, and separated flows between another pair of the three regions.

With reference to FIGS. 20-23, a heat receiver 200, according to another embodiment includes a housing 202 enclosing an area into which sunlight is directed. The heat receiver 200, in one embodiment, may include a roof (not shown in FIG. 20) over the housing 202, the roof configured to absorb and/or retain heat in the heat receiver 200. The heat receiver 200, in one embodiment, is formed of graphite. As such, the heat receiver 200 is configured to store heat over an extended period of time. In one embodiment, the heat receiver 200, or portions thereof, is formed of pyrolytic graphite, having a high thermal conductivity primarily in a single plane. In another embodiment, the heat receiver 200, or portions thereof, is formed of isotropic graphite, which is configured to conduct heat substantially equally in all directions.

Figure 21:
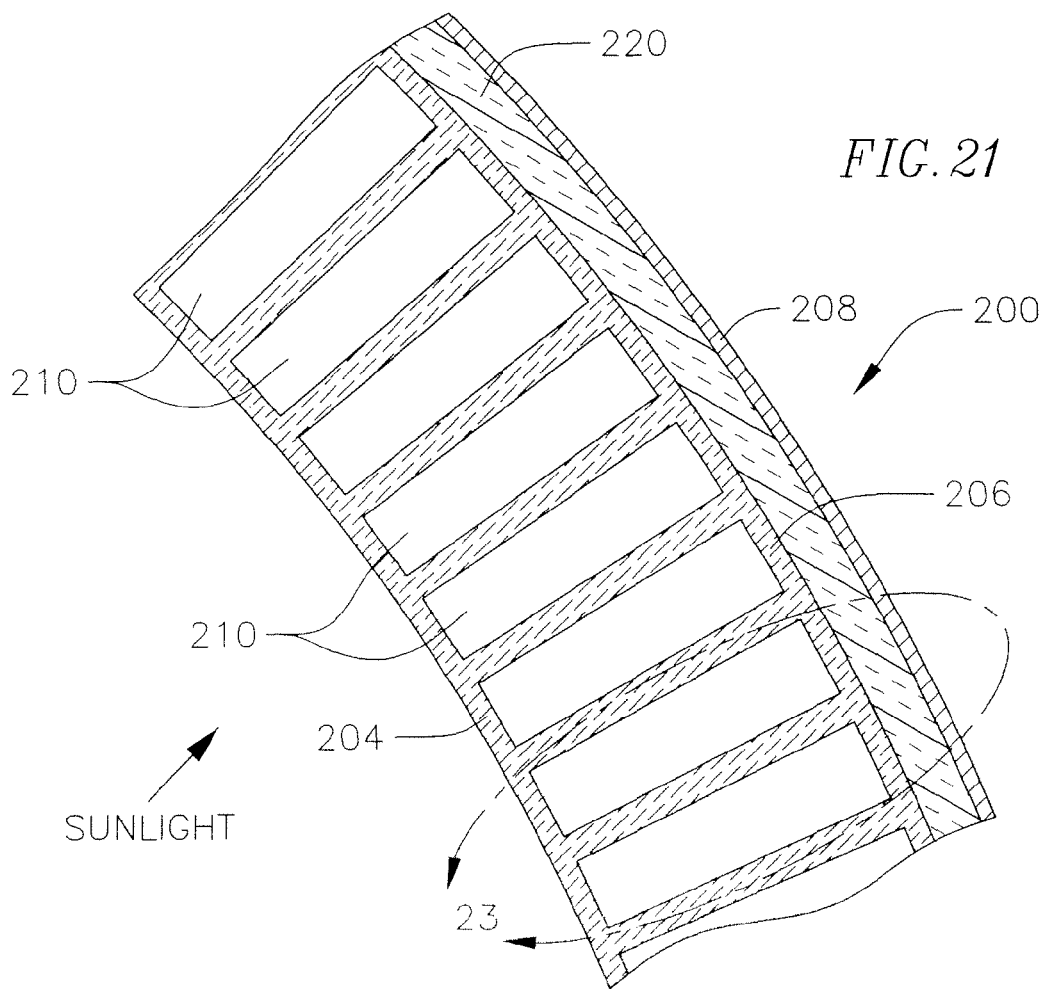
FIG. 21 is a detail view of a portion of the heat receiver of FIG. 20.

As shown in further detail in FIG. 21, the housing 202 of the heat receiver 200, according to the present embodiment, includes an inner passage wall 204, an outer passage wall 206, an outer casing 208, and a plurality of passages 210. The outer passage wall 206, in the present embodiment encloses an inner region of the heat receiver 200. The outer passage wall 206 includes an outer surface and an inner surface. Similarly, the inner passage wall 204 has an inner surface facing the center of the heat receiver 200 and an outer surface opposite the inner surface of the outer passage wall 206. In the present embodiment, the plurality of passages 210 is between the inner passage wall 204 and the outer passage wall 206.

The outer casing 208 surrounds the outer passage wall 206 and is configured to insulate and protect the heat receiver 200 from the environment. The outer casing 208 may be formed of carbon steel or aluminum sheet metal, or another suitable material, and may be painted or otherwise treated to protect the outer casing 208 from corrosion.

The heat receiver 200, according to the present embodiment, also includes insulating material 220 between the outer passage wall 206 and the outer casing 208. The insulating material 220 is configured to prevent or deter thermal energy from exiting the heat receiver 200 through the outer casing 208. Alternatively, the insulating material 220 may be adjacent an outer surface of the outer casing 208, or adjacent both an inner surface and the outer surface of the outer casing 208. The insulating material 220, in one embodiment, includes refractory insulating material. Alternatively, the insulating material 220 may include any other suitable material, such as FIBER BLOCK, PYROBLOCK, or PERLITE.

Figure 22:
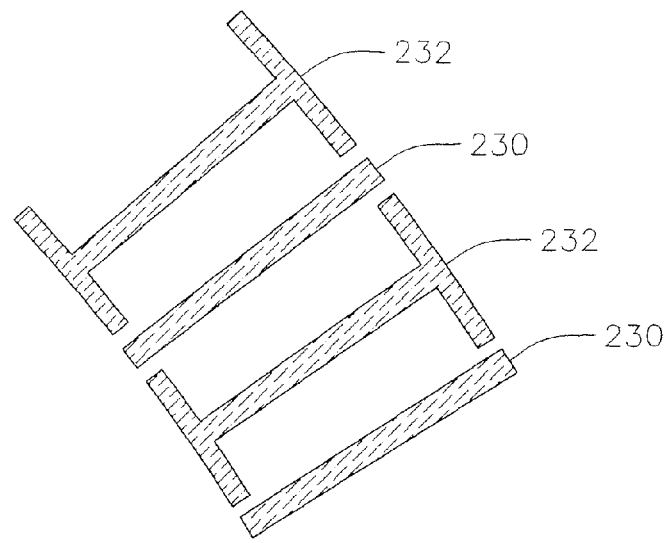
FIG. 22 is an exploded view of the portion of the heat receiver shown in FIG. 21.

With reference to FIG. 22, the housing 202 and the passages 210 therein may be formed from a plurality of connected beam elements 230 and I-beam elements 232. As described above with respect to portions of the heat receiver 200, the beam elements 230 and the I-beam elements 232 may be formed of pyrolytic graphite, isotropic graphite, or various combinations thereof in order to provide various patterns and/or rates of heat conduction in the heat receiver 200 (e.g., from the inner passage wall 204 to the outer passage wall 206. The beam elements 230 and I-beam elements 232 are connected according to an alternating pattern, whereby each beam element 230 is adjacent and connected to two I-beam elements 232, one I-beam element 232 on each side of the beam element 230. Each of the I-beam elements 232 has a length that is substantially parallel to a length of the adjacent beam element 230. Correspondingly, each I-beam element 232 is adjacent and connected to two beam elements 230, one beam element 230 on each side of the I-beam element 232. The beam elements 230 and the I-beam elements 232 are connected by any suitable device or method. Alternatively, the housing 202 and passages 210 may be formed from any other suitable structures or components. For example, the housing 202 may be formed as a unitary integral structure, such as from graphite.

Figure 23:
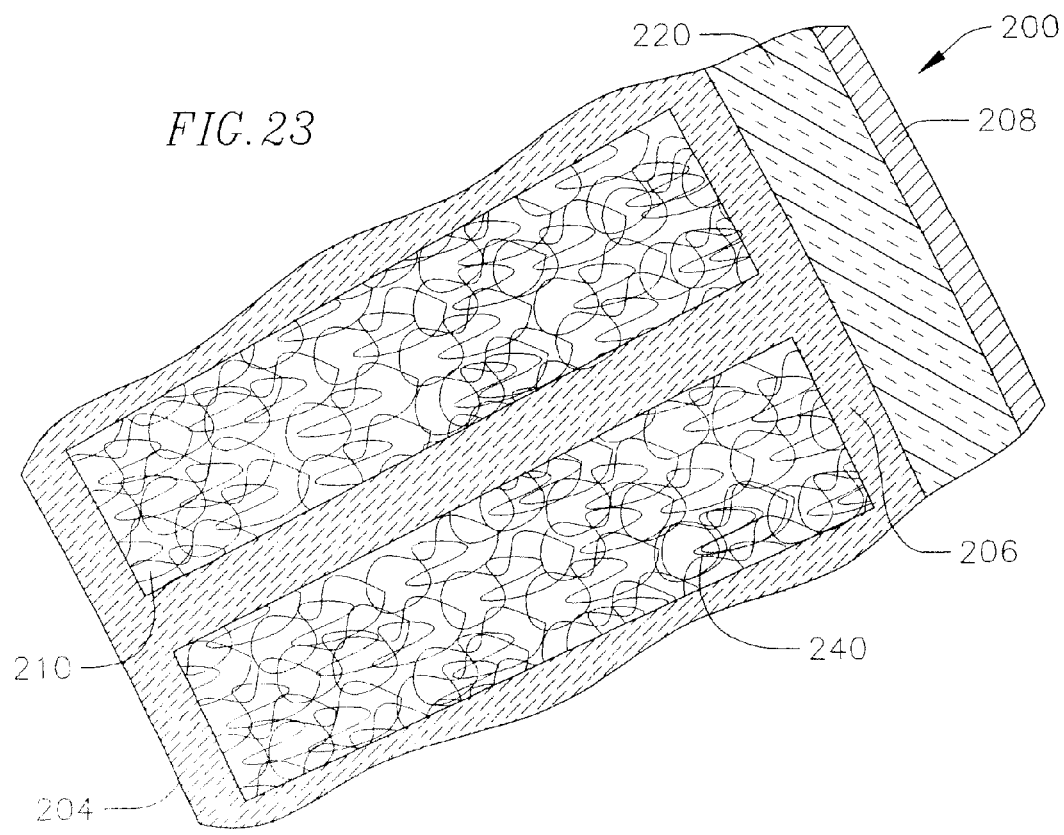
FIG. 23 is a detail view of the portion of the heat receiver shown in FIG. 21.

As shown in still further detail in FIG. 23, according to the present embodiment, each of the passages 210 includes heat absorber structures 240. The heat absorber structures 240, in the present embodiment, receive re-radiation of heat from the graphite housing 202. In the present embodiment, as shown in FIG. 23, the heat absorber structures 240 are elongated strands, having the appearance, for example, of spaghetti, and may be configured similarly to the elongated strands 60 of the heat absorbers shown and described above with respect to FIGS. 10A and 11A. Alternatively, the heat absorber structures 240 may have other suitable shapes or forms, such as a foam structure, spherical shapes, rod shapes, fin shapes, coilings, or a combination of the above-described and/or other suitable forms.

The heat absorber structures 240, according to one embodiment, are formed of silicon carbide. Alternatively, the heat absorber structures 240 may be formed of any other suitable material, such as a refractory alloy, alumina, or another high-temperature ceramic.

Figure 24:
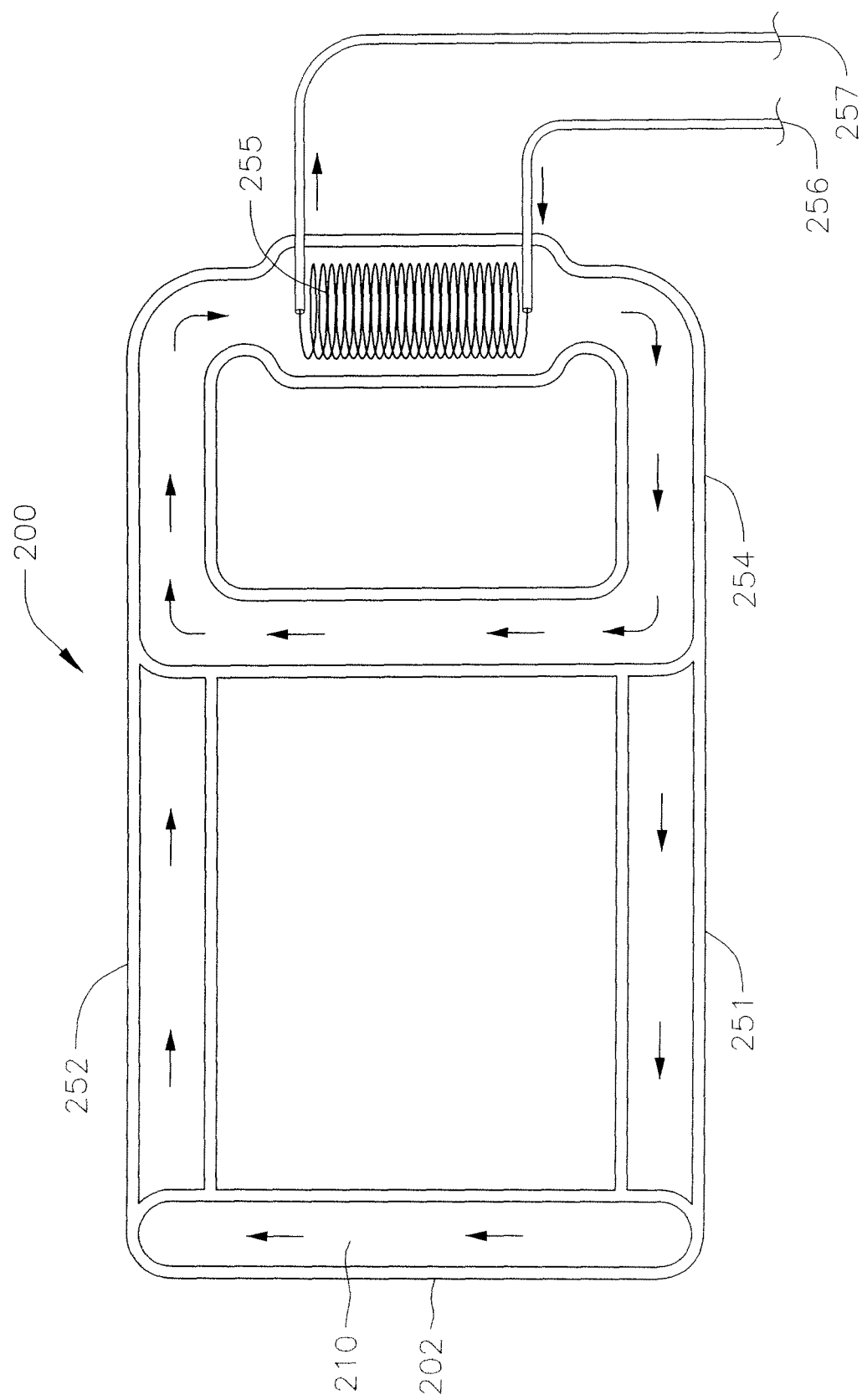
FIG. 24 is a schematic gas flow diagram of the heat receiver of FIG. 20 taken at line 24-24.

With reference to FIG. 24, a pattern of gas flow is depicted circulating through the heat receiver 200. The gas is circulated through the passages 210 of the housing 202. The gas enters the heat receiver 200 through a heat receiver inlet 251. The heat receiver inlet 251 may include a plurality of headers, each of the headers coupled to one or more of the passages 210. Similarly, the gas exits the heat receiver 200 through a heat receiver outlet 252, which may include a plurality of outlet headers coupled to the passages 210. Further, the plurality of outlet headers may be connected to an outlet plenum.

The gas flow may be air at low pressure; for example, the pressure of the heat transfer medium (air) can be between about 1 and about 1.3 bars. This is applicable to the case of steam generation for a steam turbine or in a process heat cogeneration application, since the heated air does not go directly to a turbine, but is used only in the heat exchanger.

The circulated gas is heated by solar thermal energy directed at the heat receiver 200 as the gas moves through the passages 210. In the present embodiment, as depicted in FIG. 24, the heated gas is circulated through a heat exchanging loop 254 after exiting the heat receiver through the heat receiver outlet 252. The heat exchanging loop 254 includes a heat exchanger 255 configured to utilize the heated gas from the heat receiver outlet 252 to heat gas or steam circulated through a gas or steam turbine, or used for process heat in another process, or for another cogeneration heat application. The gas or steam circulated through the turbine exits the turbine at a turbine outlet 256 at a first temperature and enters the turbine at a turbine inlet 257 at a second temperature after being heated in the heat exchanger 255, the second temperature greater than the first temperature. Within the heat exchanger 255, the heated gas from the heat receiver outlet 252 of the heat receiver 200 transfers thermal energy to the steam or gas circulated through the turbine, and in the process, is cooled before returning to the heat receiver 200 through the heat receiver inlet 251. While the gas flows are depicted in FIG. 24 as having certain directions, these directions may be reversed. The schematic gas flow diagram shown in FIG. 24 may also depict a gas flow pattern of a heat receiver according to another embodiment, such as the heat receivers 10, 20, 100 described above. Further, the exchange of heat with steam intended for a steam turbine, as described with respect to the heat exchanger 200, may similarly be performed utilizing a heat receiver having tubes, such as one of the heat receivers 10, 20, 100 described above, or one of the heat receivers 300, 400, 500, 600 described below.

Figure 25:
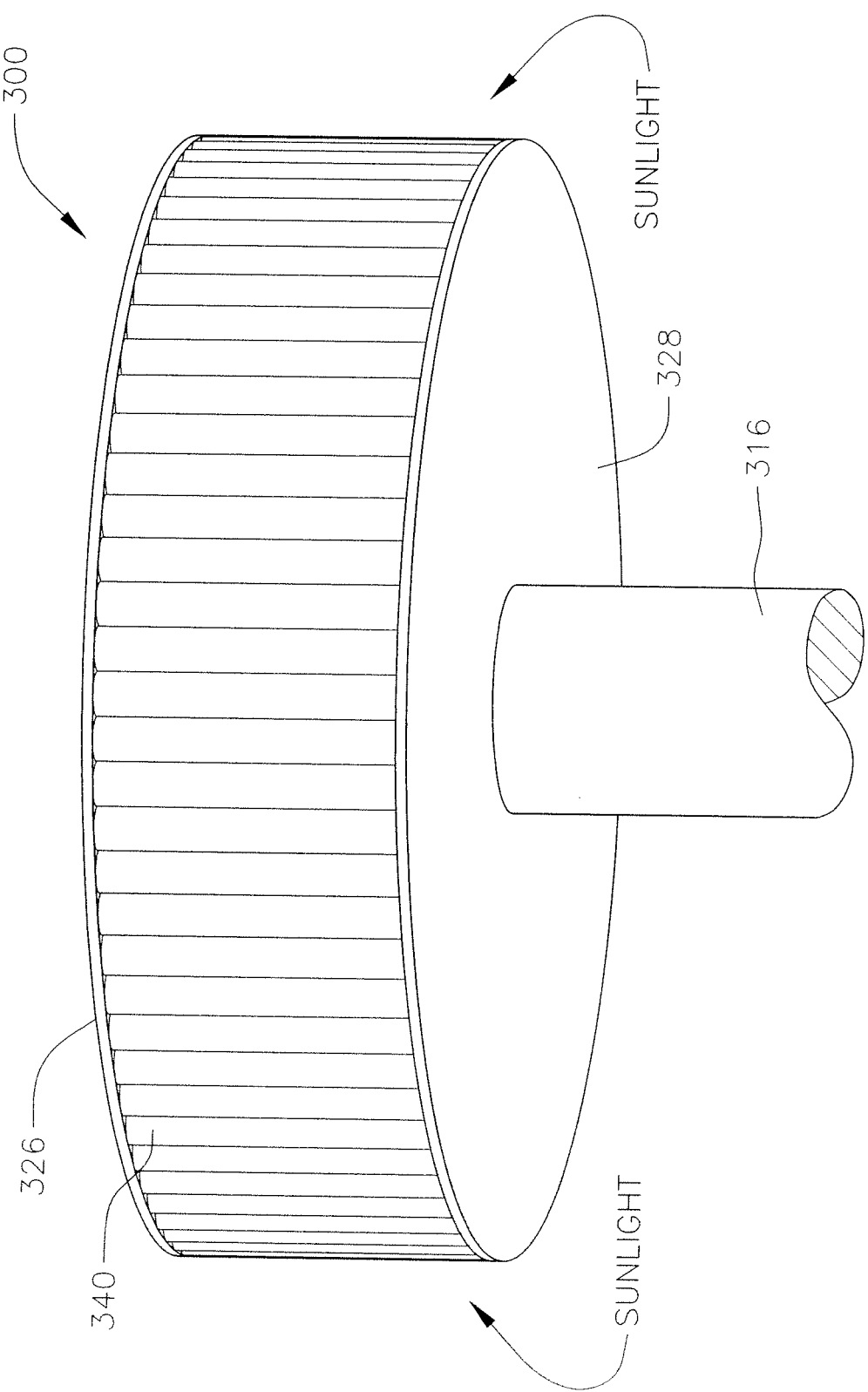
FIG. 25 is a bottom perspective view of a heat receiver according to another embodiment of the present invention.

With reference to FIG. 25, according to another embodiment, a heat receiver 300 is an external heat receiver. This is in contrast to the heat receivers 10, 20, 100 described above which are internal cavity receivers configured to receive heat radiated on one or more inner walls of the heat receiver. The heat receiver 300 is an external heat receiver configured to harness heat radiated on one or more outer walls of the heat receiver. Although an external heat receiver may be less likely to recapture heat reflected off one of its walls, it may nonetheless be more easily mounted on a tower or other support structure. In one embodiment, the heat receiver 300 includes tubes 340 that are substantially similar to the single tubes 40, or the double tubes including the outer tubes 140 and the inner tubes 142 described above. Because the heat is collected through the outer portion of the heat receiver 300, the tubes 340, in one embodiment, are located at the outer perimeter of the heat receiver 300, as shown in FIG. 25. Further, the heat receiver 300, in one embodiment, may include a roof 326, such as a roof similar to the roof 26 of the heat receiver 20 described above, and a bottom portion 328 opposite the roof 326. The heat receiver 300 may be mounted on a support structure 316 at the bottom portion 328, as shown in FIG. 25. Of course, in other embodiments, the external heat receiver 300 may have any other suitable shape or configuration of tubes 340, such as an elliptical, oblong, circular, or rectangular shape, or as described earlier with respect to FIGS. 8A-8D.

Figure 26:
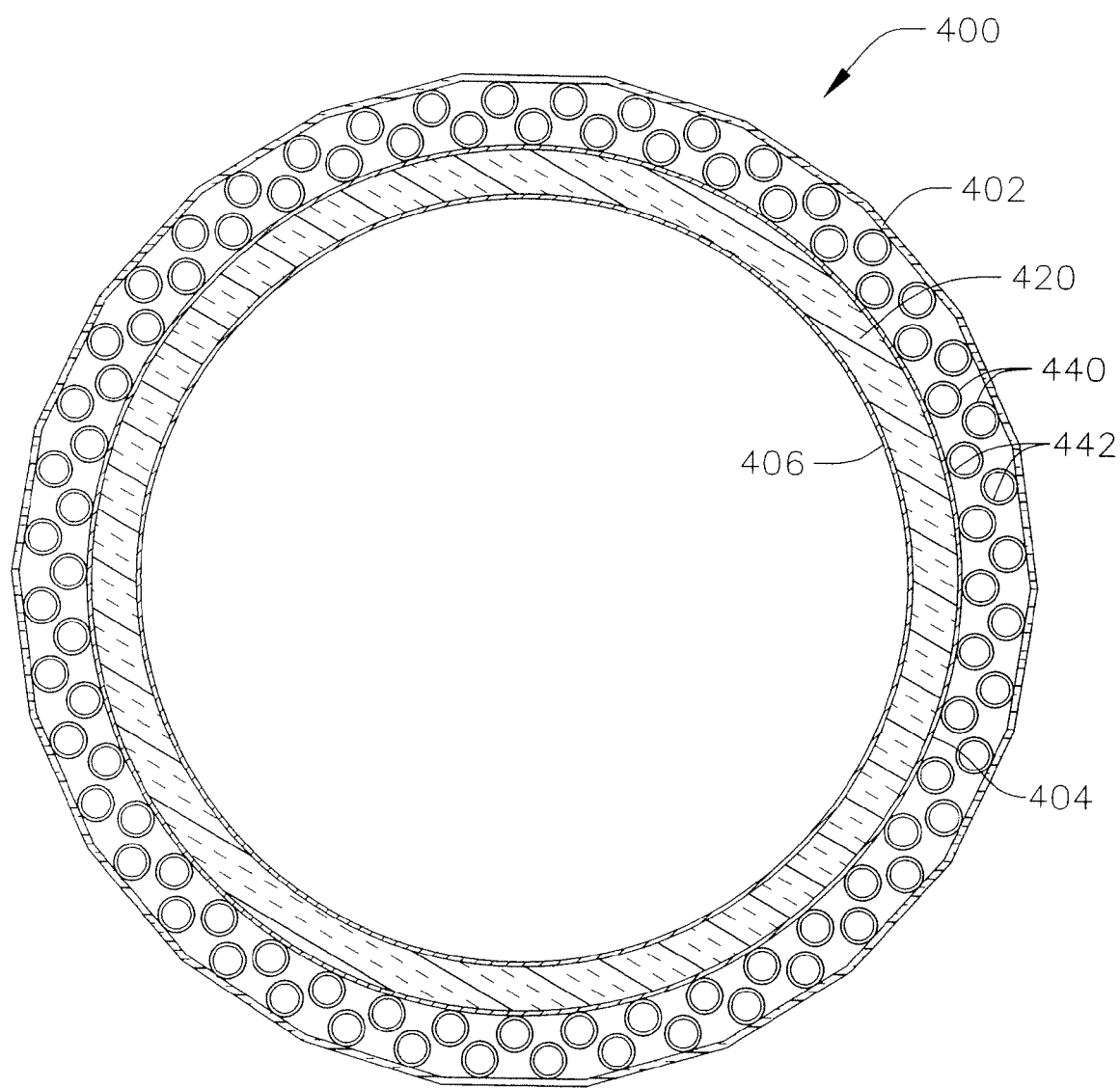
FIG. 26 is a simplified top sectional view of a heat receiver according to another embodiment of the present invention.

With reference to FIG. 26, according to another embodiment, a heat receiver 400 is configured similarly to the heat receiver 100 shown in FIG. 13A, except that the heat receiver 400 is configured as an external receiver. That is, the heat receiver 400 has a window wall 402 on an outer perimeter of the heat receiver 400 for allowing light to pass therethrough to the collecting tubes. The collecting tubes, in one embodiment, include outer tubes 440 having inner tubes 442 located therein, similar to the double tube configuration described above with respect to FIGS. 13A and 14. Additionally, because the heat receiver 400 is an external receiver, it includes insulating material 420 located at an opposite side of the tubes 440, 442 from the external window wall 402, that is, an interior side. The insulating material 420, similar to the insulating material 120 of the heat receiver 100 described above, may be located between an outer casing 404 and an inner casing 406.

Figure 27:
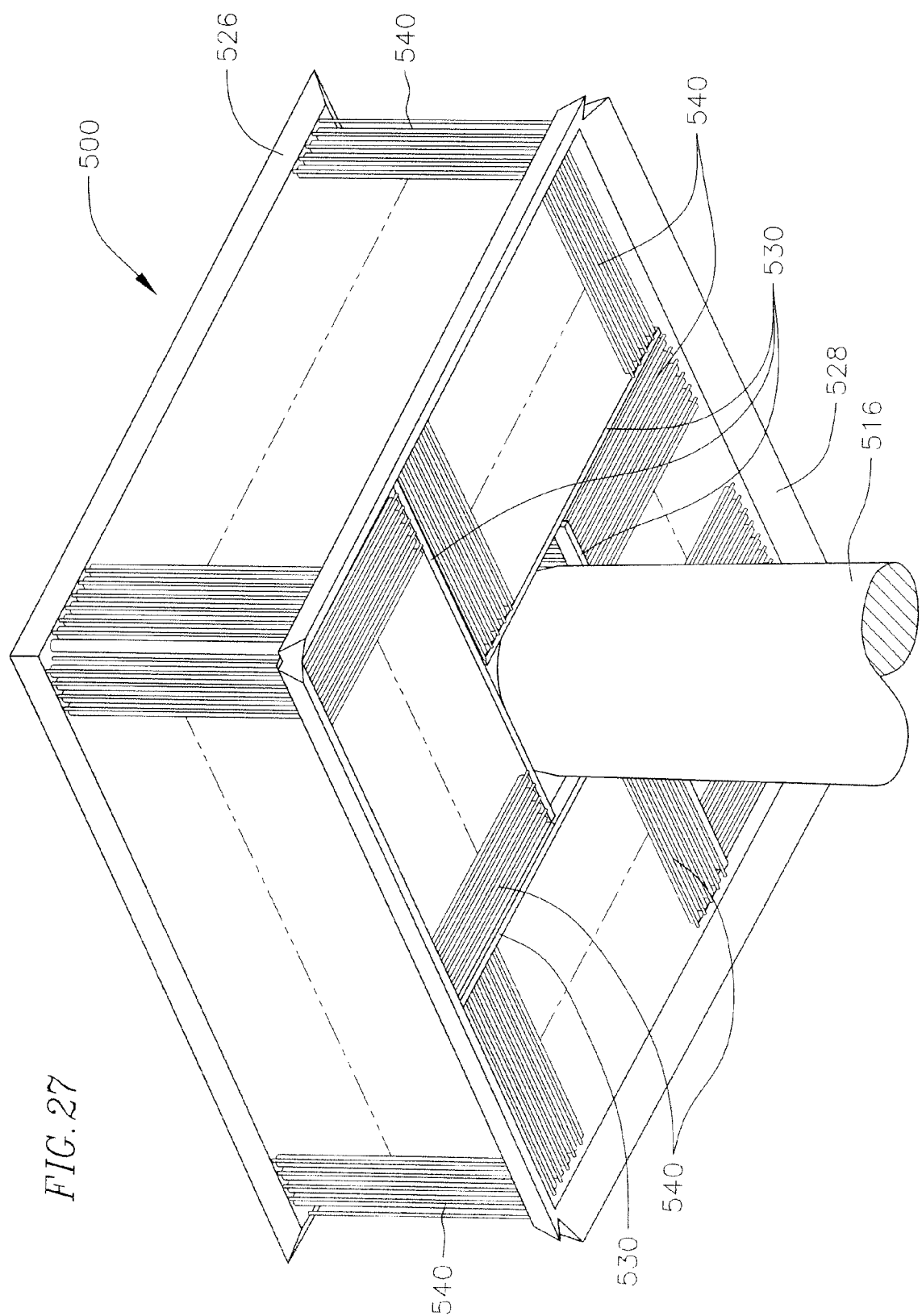
FIG. 27 is a bottom perspective view of a heat receiver according to another embodiment of the present invention.

With reference to FIG. 27, according to another embodiment, a heat receiver 500 includes various collecting portions, such as non-contiguous groups, for more effectively harnessing solar thermal energy. For example, the various portions of the heat receiver 500 may be tilted or otherwise oriented to face different angles, and thereby different regions of a heliostat field, from one another, the various portions thereby being adapted to efficiently collect radiation concurrently from multiple regions of a heliostat field, such as described above and shown by reflection lines 17 in FIG. 4. In one embodiment, as shown in FIG. 27, the heat receiver 500 has a substantially rectangular configuration. However, in alternative embodiments, the heat receiver 500 may have any other suitable shape having collecting portions facing at different angles.

The heat receiver 500, in one embodiment, includes tubes 540 that are substantially similar to the single tubes 40, or the double tubes including the outer tubes 140 and the inner tubes 142 described above. The tubes 540 may be located at a bottom portion 528 and on a perimeter of vertical side walls. The bottom portion 528 may include support members 530 for supporting the tubes 540. Additionally, in one embodiment, the heat receiver 500 may have a roof 526, such as a roof similar to the roof 26 of the heat receiver 20 described above. Further, the heat receiver 600 may be mounted on a support structure 516 at the bottom portion 528.

Figure 28:
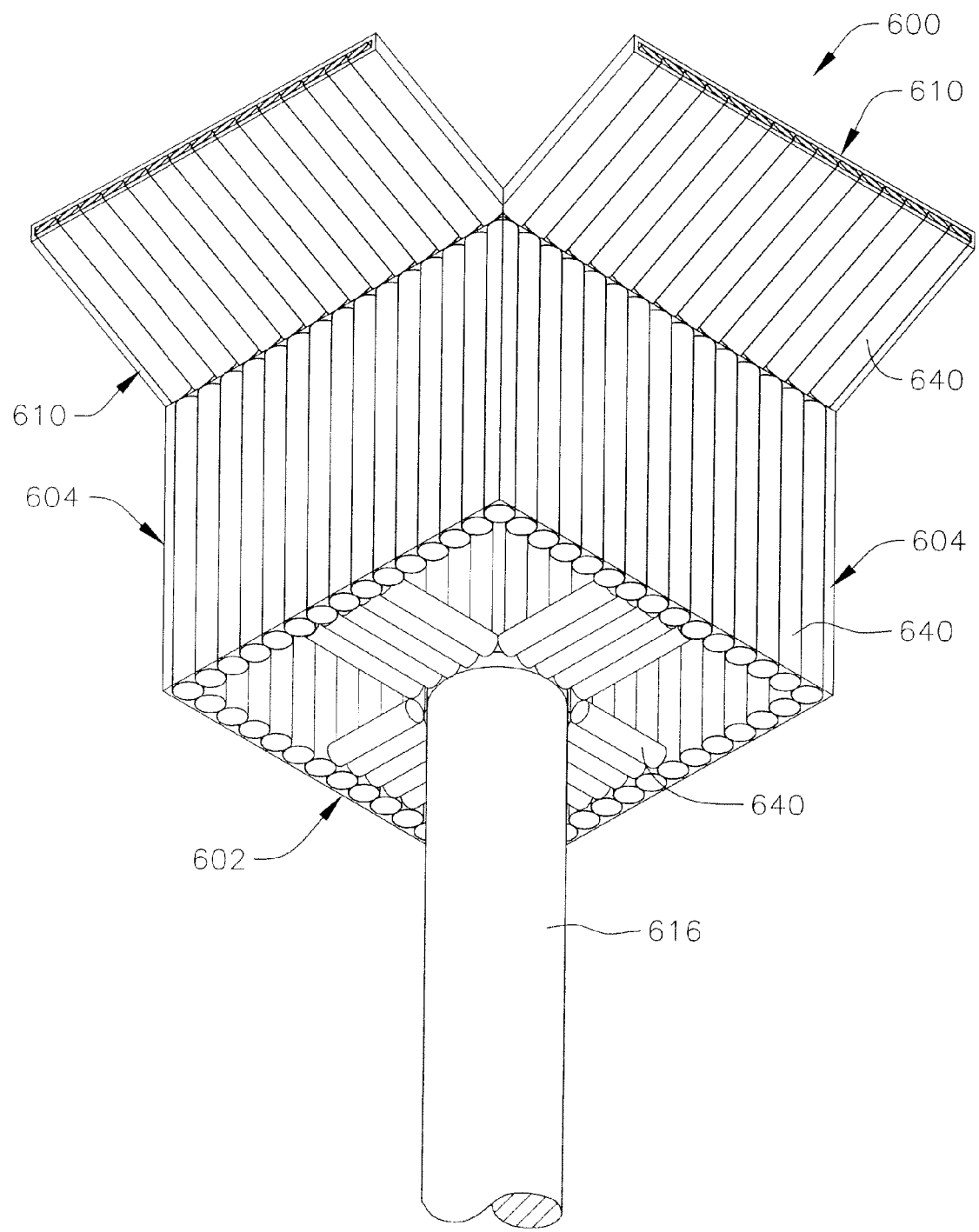
FIG. 28 is a bottom perspective view of a heat receiver according to another embodiment of the present invention.

With reference to FIG. 28, an external heat receiver 600 according to another embodiment is shown. The heat receiver 600 includes one or more top portions 610 that are angled downward and resemble flaps. The top portions 610, as well as a bottom portion 602 and side portions 604, include tubes 640 that are substantially similar to the single tubes 40, or the double tubes including the outer tubes 140 and the inner tubes 142 described above. Further, the heat receiver 600 may be mounted on a support structure 616 at the bottom portion 602.

Although the present invention has been described in certain specific embodiments, many additional modifications and variations would be apparent to those skilled in the art. For example, the heat receiver 10, the tubes 40, and/or the fins 62 may have varying configurations, sizes, or materials. Also, as another example, the number and/or orientation of the tubes 40 may vary from those described above and shown in FIGS. 8A-D. Further, as described above, the various shapes for a heat receiver, as well as the arrangements and configurations (e.g., single tubes or double tubes) of tubes thereof, as described and shown herein, may be utilized in either an internal cavity heat receiver or an external heat receiver.

It is therefore to be understood that this invention may be practiced otherwise than as specifically described. Thus, the present embodiments of the invention should be considered in all respects as illustrative and not restrictive, the scope of the invention to be determined by the claims supported by this application and their equivalents.

What is claimed is:

1. A receiver system for harnessing solar radiation, the receiver system comprising:
   a tower mounted solar receiver comprising:
      a plurality of substantially rigid transparent tubes comprising:
         an outer transparent tube; and
         an inner transparent tube at least partially within the outer transparent tube;
      a gas passage within the plurality of transparent tubes, the gas passage having a first gas inlet and a first gas outlet;
      a first heat absorber, the first heat absorber disposed in the gas passage, wherein the first heat absorber is comprised of at least one elongated strand having at least one fold;
      a casing wall having a closed geometric shape, and a window wall disposed within a perimeter of the casing wall, the plurality of transparent tubes being disposed between the casing wall and the window wall; and
      a heat exchange gas passage interposed between the casing wall and the window wall and outside of the plurality of transparent tubes, the heat exchange gas passage having a second gas inlet and a second gas outlet.

2. The receiver system of claim 1, wherein the first heat absorber comprises at least one material selected from the group consisting of nickel alloys, silicon carbide, carbon steel, and copper.

3. The receiver system of claim 1, wherein the at least one elongated strand of the first heat absorber has a pattern of the at least one fold that is irregular or pseudo-random.

4. The receiver system of claim 1, wherein the first heat absorber has an exterior finish having a solar radiation absorption coefficient between about 0.5 and 1.

5. The receiver system of claim 4, wherein an exterior surface of the first heat absorber comprises black paint.

6. The receiver system of claim 2, wherein the first heat absorber comprises a first absorber member of a first material and a second absorber member of a second material different than the first material.

7. The receiver system of claim 6, wherein:
   the first absorber member comprises at least one material selected from the group consisting of carbon steel and copper,
   the second absorber member comprises at least one material selected from the group consisting of nickel alloys and silicon carbide.

8. The receiver system of claim 1, wherein the first heat absorber occupies a volume between about 1 percent and about 20 percent of a volume of the gas passage, and a ratio of a first heat absorber surface area to a first heat absorber frontal area is at least 6 to 1.

9. The receiver system of claim 8, wherein the first heat absorber occupies a volume of about 10 percent of the volume of the gas passage.

10. The receiver system of claim 1, wherein a longitudinal axis of at least one of the substantially rigid transparent tubes is tiltable relative to one or more heliostats directing the solar radiation toward the at least one substantially rigid transparent tube.

11. The receiver system of claim 1, wherein substantially rigid transparent tubes of the plurality of substantially rigid transparent tubes have longitudinal axes tilted at different angles from one another relative to one or more heliostats directing the solar radiation toward the substantially rigid transparent tubes.

12. A receiver system for harnessing solar radiation, the receiver system comprising:
 a tower mounted solar receiver comprising:
  a transparent window wall;
  an opaque casing wall having a closed geometric shape, wherein the window wall is disposed within a perimeter of the casing wall;
  one or more transparent receiver elements disposed between the window wall and the casing wall;
  a heat exchange gas passage interposed between the window wall and the casing wall and outside of the one or more receiver elements, the heat exchange gas passage having a first gas inlet and a first gas outlet;
  a gas passage within each of the one or more transparent receiver elements, the gas passage having a second gas inlet and a second gas outlet; and
  a first heat absorber, the first heat absorber disposed in the gas passage and having a porous structure.

13. The receiver system of claim 12, wherein each of the one or more transparent receiver elements comprises:
 a transparent inner tube, wherein the gas passage is disposed within the transparent inner tube;
 a transparent outer tube, wherein the transparent outer tube is disposed about the transparent inner tube; and
 an intertube heat exchange gas passage between the transparent outer tube and the transparent inner tube, the intertube heat exchange gas passage having a third gas inlet and a third gas outlet.

14. The receiver system of claim 13, wherein the third gas outlet is coupled to the second gas inlet, whereby a gas can flow from the intertube heat exchange gas passage to the gas passage.

* * * * *